United States Patent
Koshihara et al.

(10) Patent No.: US 11,029,526 B2
(45) Date of Patent: Jun. 8, 2021

(54) OPTICAL UNIT AND DISPLAY DEVICE

(71) Applicant: SEIKO EPSON CORPORATION, Tokyo (JP)

(72) Inventors: Takeshi Koshihara, Matsumoto (JP); Kunihiko Yano, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 45 days.

(21) Appl. No.: 16/365,070

(22) Filed: Mar. 26, 2019

(65) Prior Publication Data

US 2019/0302466 A1  Oct. 3, 2019

(30) Foreign Application Priority Data

Mar. 27, 2018  (JP) .............................. JP2018-059469

(51) Int. Cl.
  *G02B 27/14* (2006.01)
  *G02B 27/09* (2006.01)
  *G02B 5/08* (2006.01)
  *G02B 27/28* (2006.01)
  *G02B 5/30* (2006.01)

(52) U.S. Cl.
  CPC .......... *G02B 27/0972* (2013.01); *G02B 5/08* (2013.01); *G02B 5/3025* (2013.01); *G02B 27/28* (2013.01)

(58) Field of Classification Search
  CPC .... G02B 27/0972; G02B 5/08; G02B 5/3025; G02B 27/28
  USPC .......... 359/629, 634, 636, 638, 641; 349/61
  See application file for complete search history.

(56) References Cited

U.S. PATENT DOCUMENTS

| 6,259,423 B1 | 7/2001 | Tokito et al. |
| 6,379,010 B1 | 4/2002 | Suzuki et al. |
| 6,882,379 B1* | 4/2005 | Yokoyama ......... G02B 27/1033 349/61 |
| 2005/0146652 A1 | 7/2005 | Yokoyama et al. |
| 2009/0021699 A1 | 1/2009 | Hsu et al. |

FOREIGN PATENT DOCUMENTS

| CN | 1273641 A | 11/2000 |
| CN | 101349818 A | 1/2009 |
| JP | H11-067448 A | 3/1999 |
| JP | 2007-304607 A | 11/2007 |
| JP | 2010-160444 A | 7/2010 |

* cited by examiner

*Primary Examiner* — William Choi
(74) *Attorney, Agent, or Firm* — Oliff PLC

(57) ABSTRACT

Provided are an optical unit and a display device that can appropriately perform reflection and transmission of image light emitted from a panel provided with a light emitting element, over a wide wavelength region in a dichroic mirror. The optical unit includes a first panel, a second panel, and a third panel arranged facing a first incident surface, a second incident surface, and a third incident surface of a dichroic prism, respectively, and each of the first panel, the second panel, and the third panel emits unpolarized image light. A polarization element is arranged between the first panel and the dichroic prism, and first image light emitted from the first panel is incident on the dichroic prism as linearly polarized light. A first dichroic mirror has polarization separation characteristics in addition to transmittance-wavelength characteristics.

12 Claims, 20 Drawing Sheets

OPTICAL UNIT AND DISPLAY DEVICE

BACKGROUND

1. Technical Field

The invention relates to an optical unit and a display device using a panel provided with a light emitting element.

2. Related Art

As an optical unit and a display device using a panel provided with a light emitting element, an aspect is conceivable in which three organic electroluminescent panels that emit unpolarized light of each of colors are arranged so as to face three incident surfaces of a dichroic prism. With this optical unit and display device, while red image light emitted from the red color organic electroluminescent panel is reflected by a first dichroic mirror toward an emission surface, the first dichroic mirror allows blue image light emitted from the blue color organic electroluminescent panel and green image light emitted from the green color organic electroluminescent panel to pass through. Further, while the blue image light emitted from the blue color organic electroluminescent panel is reflected by a second dichroic mirror toward an emission surface, the second dichroic mirror allows the red image light emitted from the red color organic electroluminescent panel and the green image light emitted from the green color organic electroluminescent panel to pass through. Thus, synthesized light that is a synthesis of the images of the red light, the green light, and the blue light is emitted from the emission surfaces of the dichroic prisms, and a color image can thus be displayed (refer to JP-A-11-67448).

While light emitted from the light emitting element, such as an organic electroluminescent element, includes oblique light that is significantly inclined with respect to a device optical axis, the dichroic mirror is incident angle dependent. Further, since the light emitted from the light emitting element, such as the organic electroluminescent element, is unpolarized light, the dichroic mirror unavoidably performs reflection and transmission of each of the color lights, only on the basis of transmittance-wavelength characteristics. Thus, in order to appropriately perform the refection and the transmission in the dichroic mirror, there is a problem that there is no choice but to adopt a configuration in which a wavelength region of each of the color lights emitted from the plurality of organic electroluminescent panels is narrowed to an extreme extent so as to widen an interval between the wavelength region of each of the color lights, or a configuration in which, of a luminous flux emitted from the plurality of organic electroluminescent panels, an effective luminous flux used for display of an image is narrowed to an extreme extent.

SUMMARY

In light of the above-described problem, an object of the invention is to provide an optical unit and a display device capable of appropriately performing reflection and transmission of an image light emitted from a panel provided with a light emitting element over a wide wavelength region in a dichroic mirror.

In order to solve the above-described problem, an aspect of an optical unit according to the invention includes a first panel provided with a first light-emitting element, a second panel provided with a second light-emitting element, a third panel provided with a third light-emitting element and a dichroic prism provided with a first incident surface on which image light emitted from the first panel is incident, as first image light of a first wavelength region, a second incident surface that faces the first incident surface, and on which image light emitted from the second panel is incident as second image light of a second wavelength region that is different from the first wavelength region, a third incident surface that is provided between the first incident surface and the second incident surface, and on which image light emitted from the third panel is incident as third image light of a third wavelength region that is different from the first wavelength region and the second wavelength region, an emission surface that faces the third incident surface, a first dichroic mirror that reflects the first image light toward the emission surface and allows the second image light and the third image light to pass through, and a second dichroic mirror that reflects the second image light toward the emission surface and allows the first image light and the third image light to pass through, wherein a polarization element that allow, of first polarized light and second polarized light having different polarization directions, the first polarized light to pass through, is arranged in an optical path from at least one of light-emitting elements including the first light emitting element, the second light emitting element, and the third light emitting element, to the dichroic prism, and at least one of the first dichroic mirror and the second dichroic mirror has polarization separation characteristics.

According to an aspect of the invention, the polarization element is arranged in the optical path from at least one of light-emitting elements including the first light emitting element, the second light emitting element, and the third light emitting element, to the dichroic prism, and at least one of the first dichroic mirror and the second dichroic mirror has the polarization separation characteristics. Thus, in addition to transmittance-wavelength characteristics, the dichroic mirror performs reflection and transmission of each of color lights on the basis of a polarization direction of incident light. Thus, even when there is a circumstance in which light emitted from the light emitting element includes oblique light that is significantly inclined with respect to a device optical axis, or even when there is a circumstance in which the dichroic mirror is incident angle dependent, reflection and transmission of the image light emitted from the light emitting element can be appropriately performed in the dichroic mirror. Thus, when the optical unit is used as a display device, a high quality image can be displayed without adopting a configuration in which the wavelength region of each of the color lights emitted from the light-emitting elements is narrowed to an extreme extent, or a configuration in which, of a luminous flux emitted from the panel, an effective luminous flux used for display of an image is significantly narrowed, for example.

According to the invention, an aspect can be adopted in which the polarization element is arranged in the optical path from the at least one of light-emitting elements including the first light emitting element, the second light emitting element, and the third light emitting element, to the dichroic prism, and one of the first dichroic mirror and the second dichroic mirror has the polarization separation characteristics.

According to the invention, an aspect can be adopted in which the at least one of light-emitting elements is the light emitting element corresponding to image light having the longest wavelength including the first light emitting element, the second light emitting element, and the third light emitting element.

According to the invention, an aspect can be adopted in which the at least one of light-emitting elements is the light emitting element having the longest life when the first light emitting element, the second light emitting element, and the third light emitting element are driven under a condition in which synthesized light of light emitted from the first light emitting element, light emitted from the second light emitting element, and light emitted from the third light emitting element forms white light.

According to the invention, an aspect can be adopted in which the at least one of light-emitting elements is one of the first light emitting element and the second light emitting element.

According to the invention, an aspect can be adopted in which the polarization element is arranged in an optical path from one panel of the first panel, the second panel, and the third panel, to the dichroic prism, the one panel including the at least one of light-emitting elements.

According to the invention, an aspect can be adopted in which, of a luminous flux of image light emitted toward the dichroic prism from the one panel, the polarization element is provided over an entire region through which an effective luminous flux corresponding to a luminous flux emitted from the emission surface passes.

According to the invention, an aspect may be adopted in which, of a luminous flux of image light emitted toward the dichroic prism from the one panel, the polarization element is provided over an entire region through which an effective luminous flux used in display of an image passes.

According to a display device provided with the optical unit to which the invention is applied, the display device displays an image using synthesized light of the first image light, the second image light, and the third image light emitted from the emission surface of the dichroic prism.

According to a display device according to the invention, an aspect can be adopted in which the display device includes a virtual display unit configured to display a virtual image using the synthesized light. According to the display device according to the invention, an aspect can be adopted in which the display device includes a projection optical system configured to project the synthesized light.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
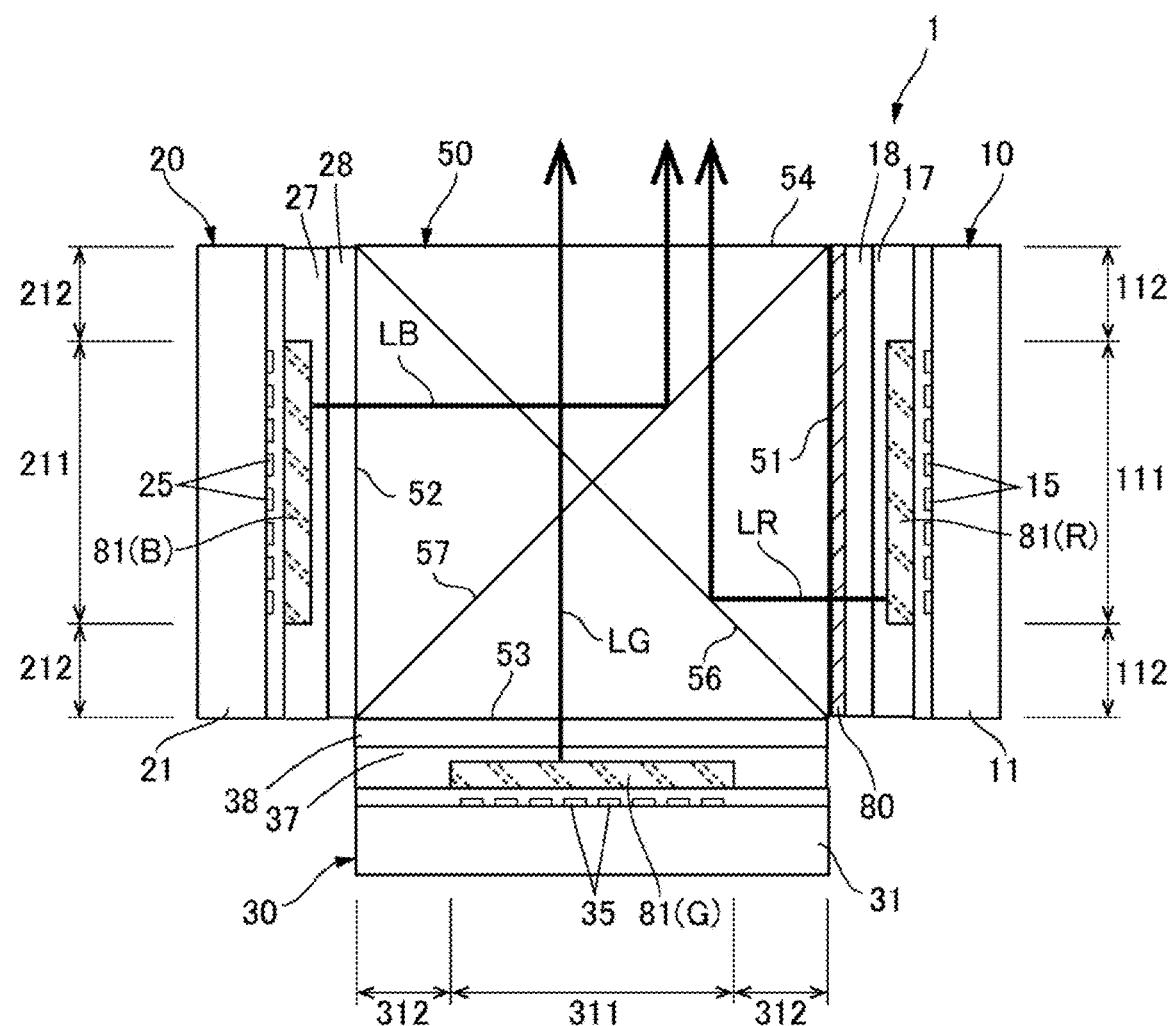
FIG. 1 is a plan view illustrating an optical unit to which the invention is applied.

Exemplary embodiments of the invention will be described. Note that in the drawings referred to in the description below, to illustrate each layer or each member at a recognizable size on the drawings, a number and scale of each layer or each member are different.

Overall Configuration

Figure 2:
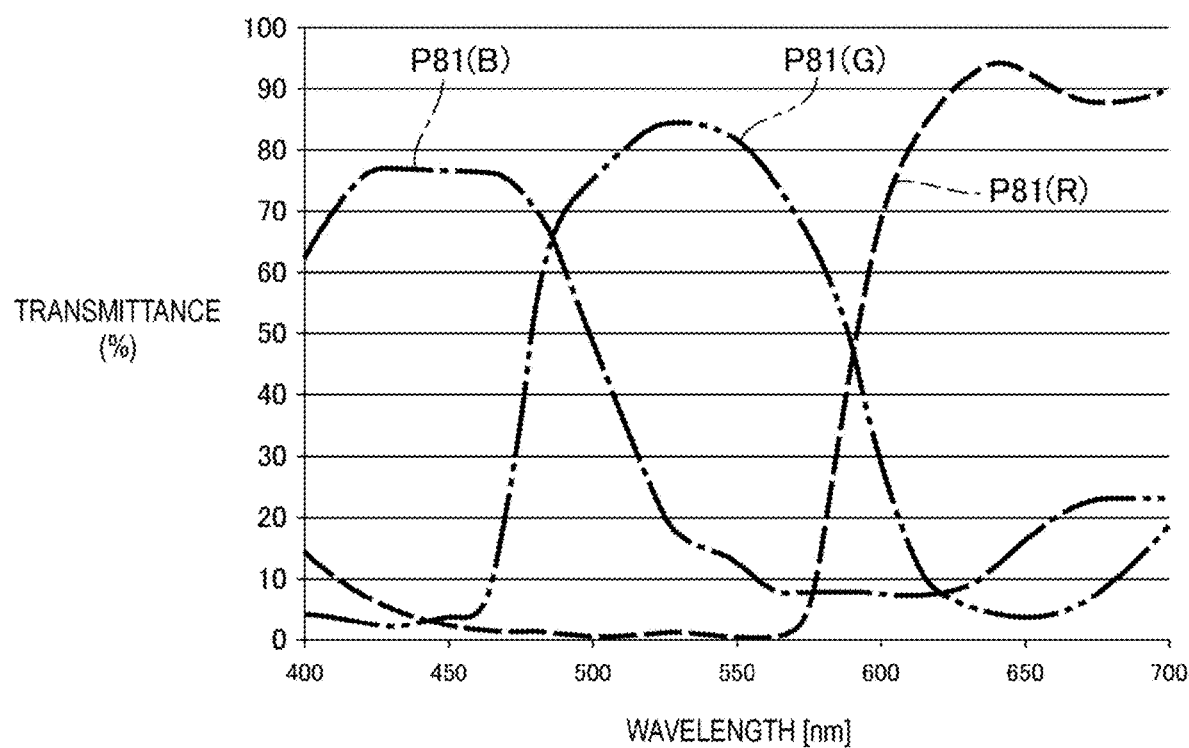
FIG. 2 is an explanatory diagram illustrating transmittance-wavelength characteristics of a first pigment layer and the like illustrated in FIG. 1.
Figure 3:
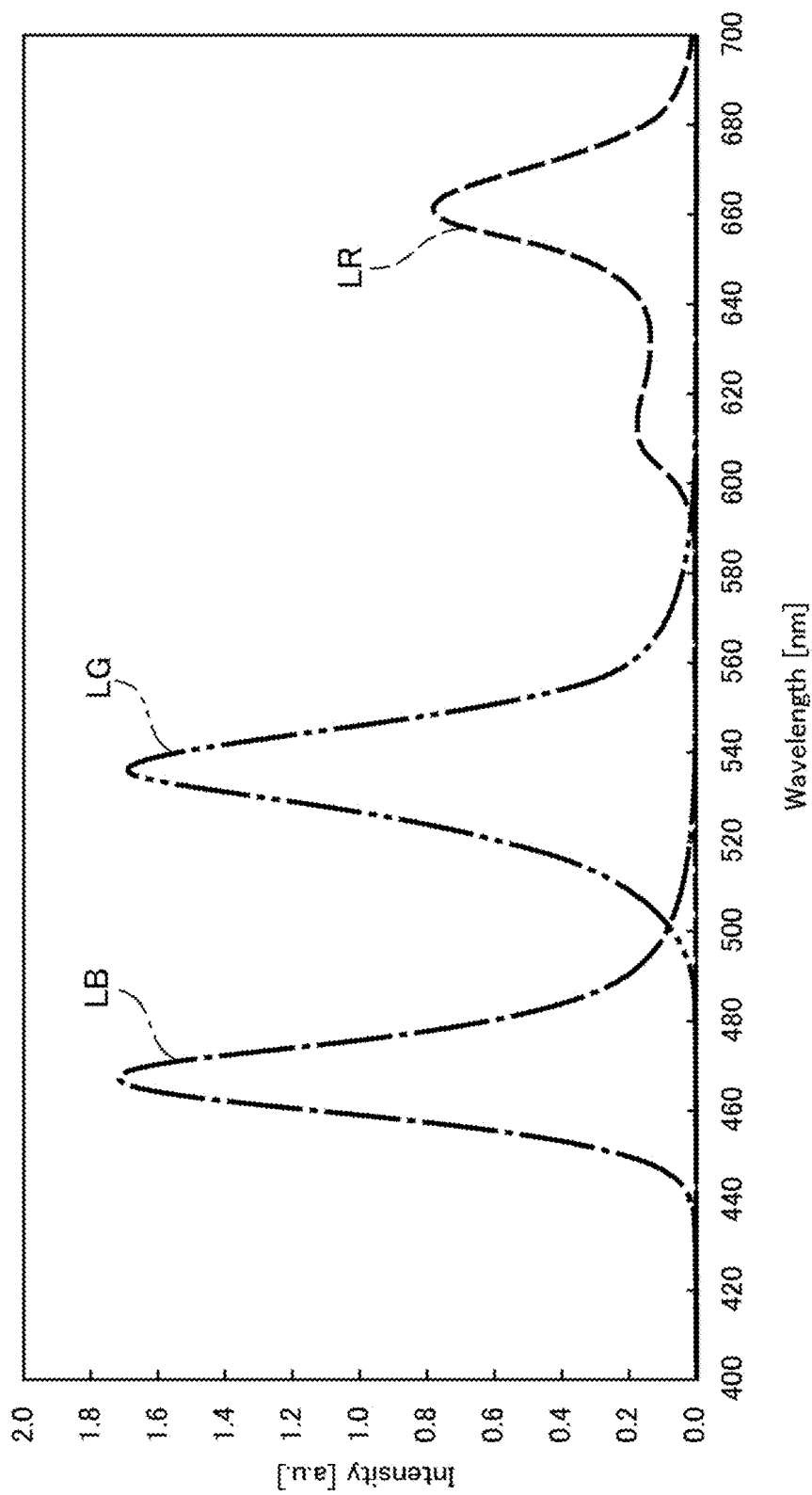
FIG. 3 is an explanatory diagram illustrating a spectrum of first image light and the like illustrated in FIG. 1.

FIG. 1 is a plan view of an optical unit 1 to which the invention is applied. FIG. 2 is an explanatory diagram illustrating transmittance-wavelength characteristics of a first pigment layer 81(R) and the like illustrated in FIG. 1. FIG. 3 is an explanatory diagram illustrating a spectrum of first image light LR and the like illustrated in FIG. 1.

As illustrated in FIG. 1, the optical unit 1 includes a first panel 10 provided with a plurality of first light-emitting elements 15 in a first display region 111 that is a display region of a first substrate 11, a second panel 20 provided with a plurality of second light-emitting elements 25 in a second display region 211 that is a display region of a second substrate 21, a third panel 30 provided with a plurality of third light-emitting elements 35 in a third display region 311 that is a display region of a third substrate 31, and a dichroic prism 50.

Image light emitted from the first panel 10 is incident on the dichroic prism 50 as first image light LR of a first wavelength region. Image light emitted from the second panel 20 is incident on the dichroic prism 50 as second image light LB of a second wavelength region. Image light emitted from the third panel 30 is incident on the dichroic prism 50 as third image light LG of a third wavelength region. In the exemplary embodiment, the first panel 10 emits the first image light LR of the first wavelength region from the first display region 111. The second panel 20 emits the second image light LB of the second wavelength region from the second display region 211. The third panel 30 emits third image light LG of a third wavelength region from the third display region 311. In the exemplary embodiment, the first wavelength region is from 620 nm to 750 nm, for example, and the first panel 10 emits the red color first image light LR. The second wavelength region is from 450 nm to 495 nm, for example, and the second panel 20 emits the blue color second image light LB. The third wavelength region is from 495 nm to 570 nm, for example, and the third panel 30 emits the green color third image light LG.

In the exemplary embodiment, as a result of emitting white light from the plurality of first light-emitting elements 15 provided in the first display region 111, in the first substrate 11, on the side of the dichroic prism 50 with respect to the first light-emitting elements 15, the first panel 10 has a first pigment layer 81(R) that colors the image light emitted from the first light-emitting elements 15 to be the first image light LR of the first wavelength region. As a result of emitting white light from the plurality of second light-emitting elements 25 provided in the second display region 211, in the second substrate 21, on the side of the dichroic prism 50 with respect to the second light-emitting elements 25, the second panel 20 has a second pigment layer 81(B) that colors the image light emitted from the second light-emitting elements 25 to be the second image light LB of the second wavelength region. As a result of emitting white light from the plurality of third light-emitting elements 35 provided in the third display region 311, in the third substrate 31, on the side of the dichroic prism 50 with respect to the third light-emitting elements 35, the third panel 30 has a third pigment layer 81(G) that colors the image light emitted from the third light-emitting elements 35 to be the third image light LG of the third wavelength region. In the exemplary embodiment, the first light-emitting elements 15, the second light-emitting elements 25, and the third light-emitting elements 35 are all organic electroluminescent elements and emit unpolarized light.

In the exemplary embodiment, the first pigment layer 81(R) has the transmittance-wavelength characteristics indicated by a dashed line P81(R) in FIG. 2, and is a light-absorbing filter layer that absorbs light other than the red light. The second pigment layer 81(B) has the transmittance-wavelength characteristics indicated by a one-dot chain line P81(B) in FIG. 2, and is a light absorbing filter layer that absorbs light other than blue light. The third pigment layer 81(G) has the transmittance-wavelength characteristics indicated by a two-dot chain line P81(G) in FIG. 2, and is a light absorbing filter layer that absorbs light other than green light. Thus, the first image light LR has a spectrum indicated by a dashed line LR in FIG. 3, the second image light LB has a spectrum indicated by a one-dot chain line LB in FIG. 3, and the third image light LG has a spectrum indicated by a two-dot chain line LG in FIG. 3.

The dichroic prism 50 includes a first incident surface 51, a second incident surface 52 that faces the first incident surface 51, a third incident surface 53 that is provided between the first incident surface 51 and the second incident surface 52, and an emission surface 54 that faces the third incident surface 53. The first panel 10 is arranged so as to face the first incident surface 51, and the image light emitted from the first panel 10 is incident on the first incident surface 51 as the first image light LR of the first wavelength region. The second panel 20 is arranged so as to face the second incident surface 52, and the image light emitted from the second panel 20 is incident on the second incident surface 52 as the second image light LB of the second wavelength region. The third panel 30 is arranged so as to face the third incident surface 53, and the image light emitted from the third panel 30 is incident on the third incident surface 53 as the third image light LG of the third wavelength region. The first panel 10, the second panel 20, and the third panel 30 are fixed to the dichroic prism 50 by a transmissive adhesive layer, for example.

The dichroic prism 50 includes a first dichroic mirror 56, and a second dichroic mirror 57 that are arranged so as to intersect each other at a 45 degree angle. The first dichroic mirror 56 reflects the first image light LR toward the emission surface 54 and allows the second image light LB and the third image light LG to pass through. The second dichroic mirror 57 reflects the second image light LB toward the emission surface 54 and allows the first image light LR and the third image light LG to pass through.

Electrical Configuration of First Panel 10

Figure 4:
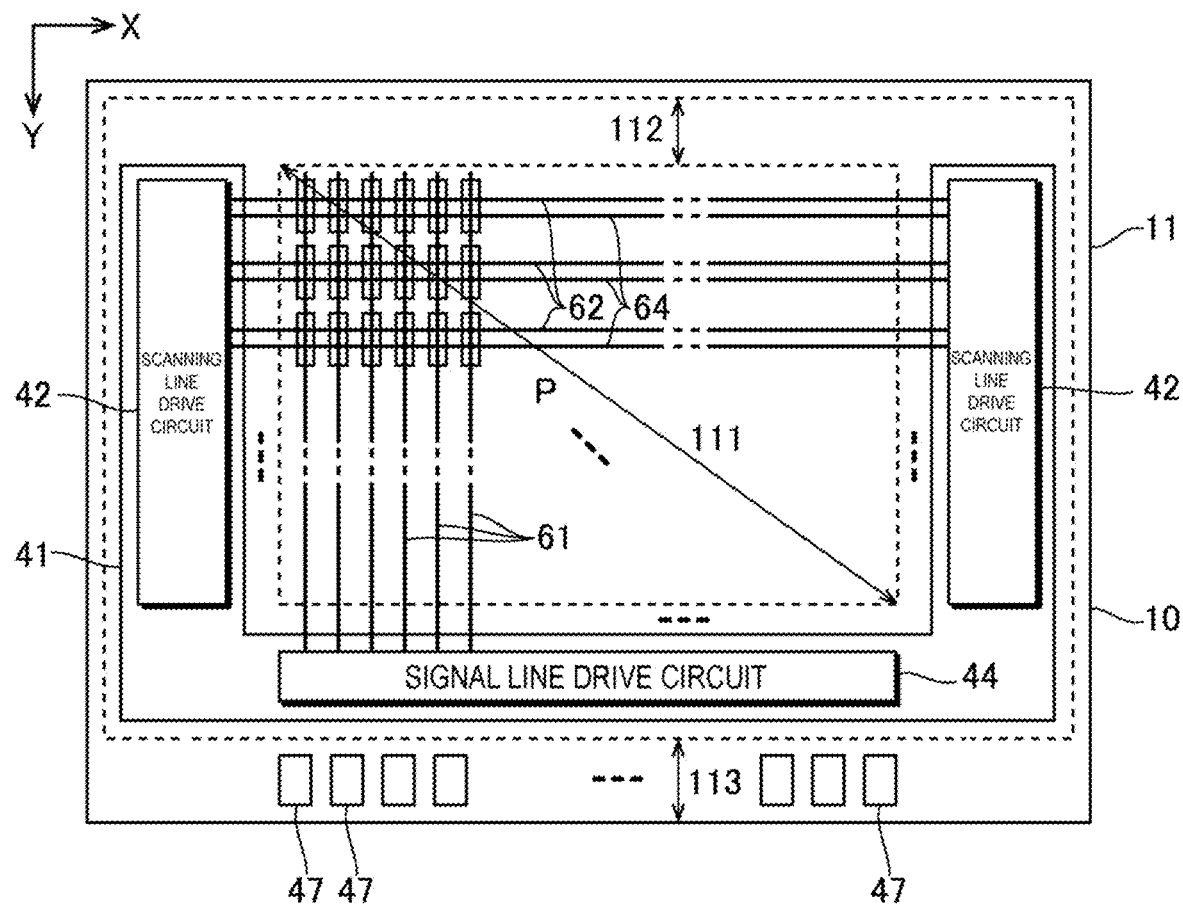
FIG. 4 is an explanatory diagram illustrating an electrical configuration of a first panel illustrated in FIG. 1.
Figure 5:
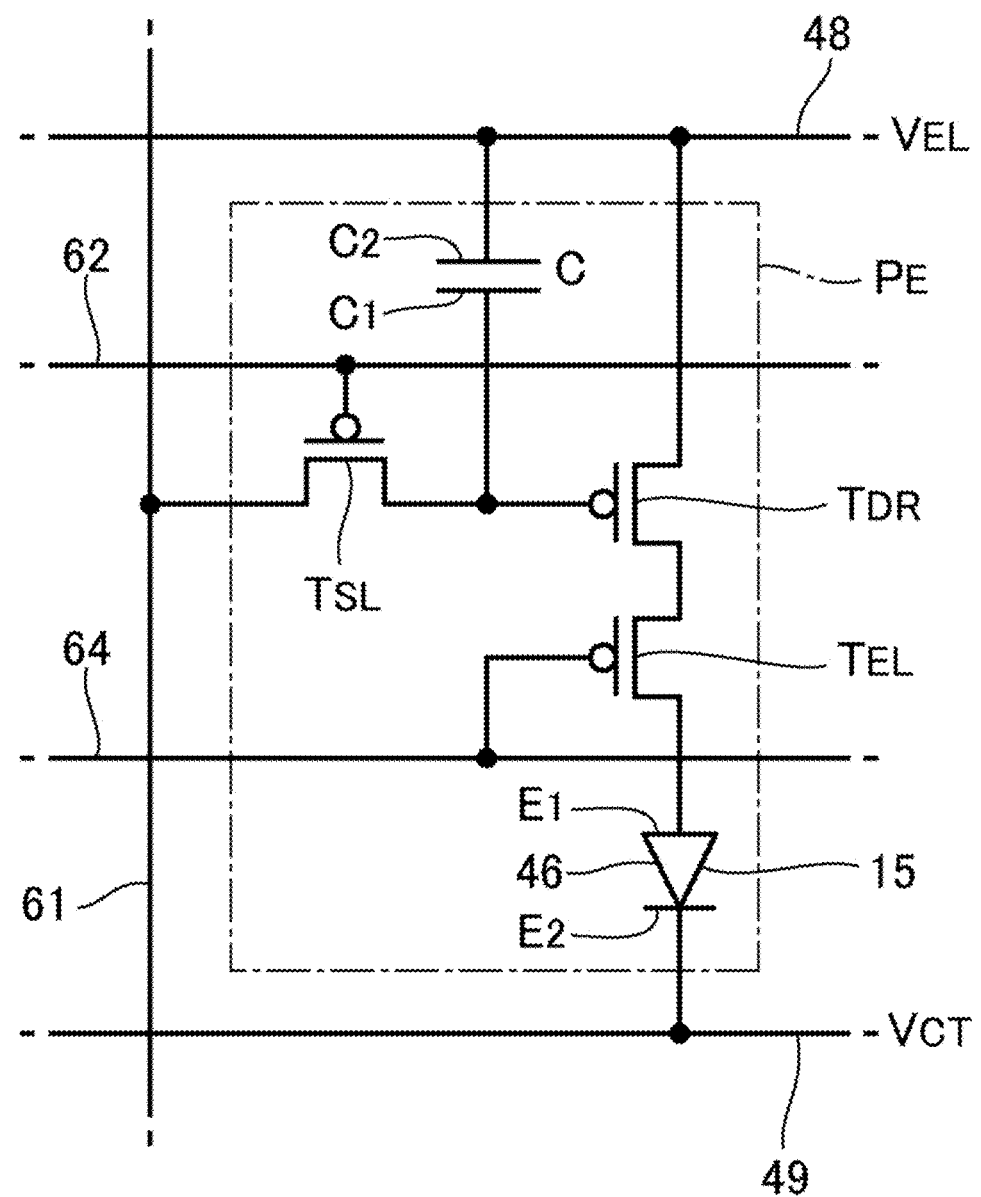
FIG. 5 is a circuit diagram of each of pixels (pixel circuits) in a first display region illustrated in FIG. 6.

FIG. 4 is an explanatory diagram illustrating an electrical configuration of the first panel 10 illustrated in FIG. 1. FIG. 5 is a circuit diagram of each of pixels (pixel circuits) in the first display region 111 illustrated in FIG. 4. Note that, in the following explanation, an "upper layer side" and an "upper surface" refer to an opposite side to the first substrate 11.

As illustrated in FIG. 4, in the first panel 10, the first display region 111, a peripheral region 112, and a mounting region 113 are provided on one surface of the first substrate 11. In the exemplary embodiment, the first substrate 11 is a silicon semiconductor substrate or the like. In the first substrate 11, the first display region 111 is a rectangular region in which a plurality of pixels P are arrayed. A plurality of scanning lines 62 that extend in an X direction, a plurality of control lines 64 that extend in the X direction in correspondence to each of the scanning lines 62, and a plurality of signal lines 61 that extend in a Y direction intersecting the X direction are formed in the first display region 111. The pixels P are formed corresponding to each intersection of the plurality of scanning lines 62 and the plurality of signal lines 61. Thus, the plurality of pixels P are arrayed in a matrix over the X direction and the Y direction.

The peripheral region 112 is a rectangular frame-shaped region that surrounds the periphery of the first display region 111. A drive circuit 41 is provided in the peripheral region 112. The drive circuit 41 is a circuit that drives each of the pixels P inside the first display region 111, and is configured so as to include two scanning line drive circuits 42 and and a signal line drive circuit 44. The first panel 10 of the exemplary embodiment is a circuit incorporating display device in which the drive circuit 41 is configured by active elements, such as a transistor, formed directly on the surface of the first substrate 11.

The mounting region 113 is a region on the opposite side of the first display region 111 with the peripheral region 112 positioned therebetween, and a plurality of mounting terminals 47 are arrayed in the mounting region 113. Control signals and a power supply potential are supplied to each of the mounting terminals 47 from various external circuits (not illustrated), such as a control circuit and a power supply circuit. The external circuits are mounted on a flexible circuit board (not illustrated) that is bonded to the mounting region 113, for example.

As illustrated in FIG. 5, the pixel P is configured so as to include the first light-emitting element 15, a drive transistor TDR, a light emission control transistor TEL, a selection transistor TSL, and a capacitative element C. Note that, in FIG. 7, each of the transistors T (TDR, TEL, and TSL) of the pixel P are p-channel type transistors, but n-channel type transistors can also be used.

The first light-emitting element 15 is an electro-optical element in which a light-emitting functional layer 46 that includes a light-emitting layer of an organic EL material is interposed between a first electrode E1 (a positive electrode) and a second electrode E2 (a negative electrode). The first electrode E1 is formed individually for each of the pixels P, and the second electrode E2 is continuous across the plurality of pixels P. The first light-emitting element 15 is arranged on a current path that connects a first power supply conductor 48 and a second power supply conductor 49. The first power supply conductor 48 is a power supply line to which a higher-side power supply potential (a first potential) VEL is supplied, and the second power supply conductor 49 is a power supply line to which a lower-side power supply potential (a second potential) VCT is supplied.

The drive transistor TDR and the light emission control transistor TEL are arranged on the current path that connects the first power supply conductor 48 and the second power supply conductor 49, in series with the first light-emitting element 15. Specifically, one side (the source) of a pair of current terminals of the drive transistor TDR is connected to the first power supply conductor 48. The light emission control transistor TEL functions as a switch that controls a conductive state (conductive/non-conductive) between the other side (the drain) of the pair of current terminals of the drive transistor TDR, and the first electrode E1 of the first light-emitting element 15. The drive transistor TDR generates a drive current of an amperage corresponding to a voltage between a gate and the source of the drive transistor TDR. In a state in which the light emission control transistor TEL is controlled to be ON, the drive current is supplied from the drive transistor TDR to the first light-emitting element 15 via the light emission control transistor TEL, and the first light-emitting element 15 thus emits light at a luminance corresponding to the amperage of the drive current. In a state in which the light emission control transistor TEL is controlled to be OFF, the supply of the drive current to the first light-emitting element 15 is cut off, and the first light-emitting element 15 is thus extinguished. A gate of the light emission control transistor TEL is connected to the control line 64.

The selection transistor TSL functions as a switch that controls a conductive state (conductive/non-conductive) between the signal line 61 and the gate of the drive transistor TDR. A gate of the selection transistor TSL is connected to the scanning line 62. Further, the capacitive element C is an electrostatic capacitance obtained by interposing a dielectric substance between a first electrode C1 and a second electrode C2. The first electrode C1 is connected to the gate of the drive transistor TDR, and the second electrode C2 is connected to the first power supply conductor 48 (the source of the drive transistor TDR). Thus, the capacitive element C holds the voltage between the gate and source of the drive transistor TDR.

The signal line drive circuit 44 supplies a grayscale potential (a data signal) depending on a grayscale specified for each of the pixels P by an image signal supplied from an external circuit, to the plurality of signal lines 61, in parallel, for each write period (horizontal scanning period). Meanwhile, by supplying a scanning signal to each of the scanning lines 62, each of the scanning line drive circuits 42 sequentially selects each of the plurality of scanning lines 62 for each write period. The selection transistor TSL of each of the pixels P corresponding to the scanning line 62 selected by the scanning line drive circuits 42 switches to an ON state. Thus, the grayscale potential is supplied to the gate of the drive transistor TDR of each of the pixels P, via the signal line 61 and the selection transistor TSL, and the voltage according to the grayscale potential is held in the capacitative element C. Meanwhile, when the selection of the scanning lines 62 in the write period ends, each of the scanning line drive circuits 42 supplies a control signal to each of the control lines 64, thus controlling the light emission control transistor TEL of each of the pixels P corresponding to the control lines 64 to be in an ON state. Thus, a drive current that accords with the voltage held in the capacitative element C in the immediately preceding write period is supplied to the first light-emitting element 15 from the the drive transistor TDR via the light emission control transistor TEL. In this way, the first light-emitting element 15 emits light at a luminance that accords with the grayscale potential. As a result, the desired first image light LR specified by the image signal is emitted from the first display region 111.

Cross-Sectional Configuration of First Panel 10

Figure 6:
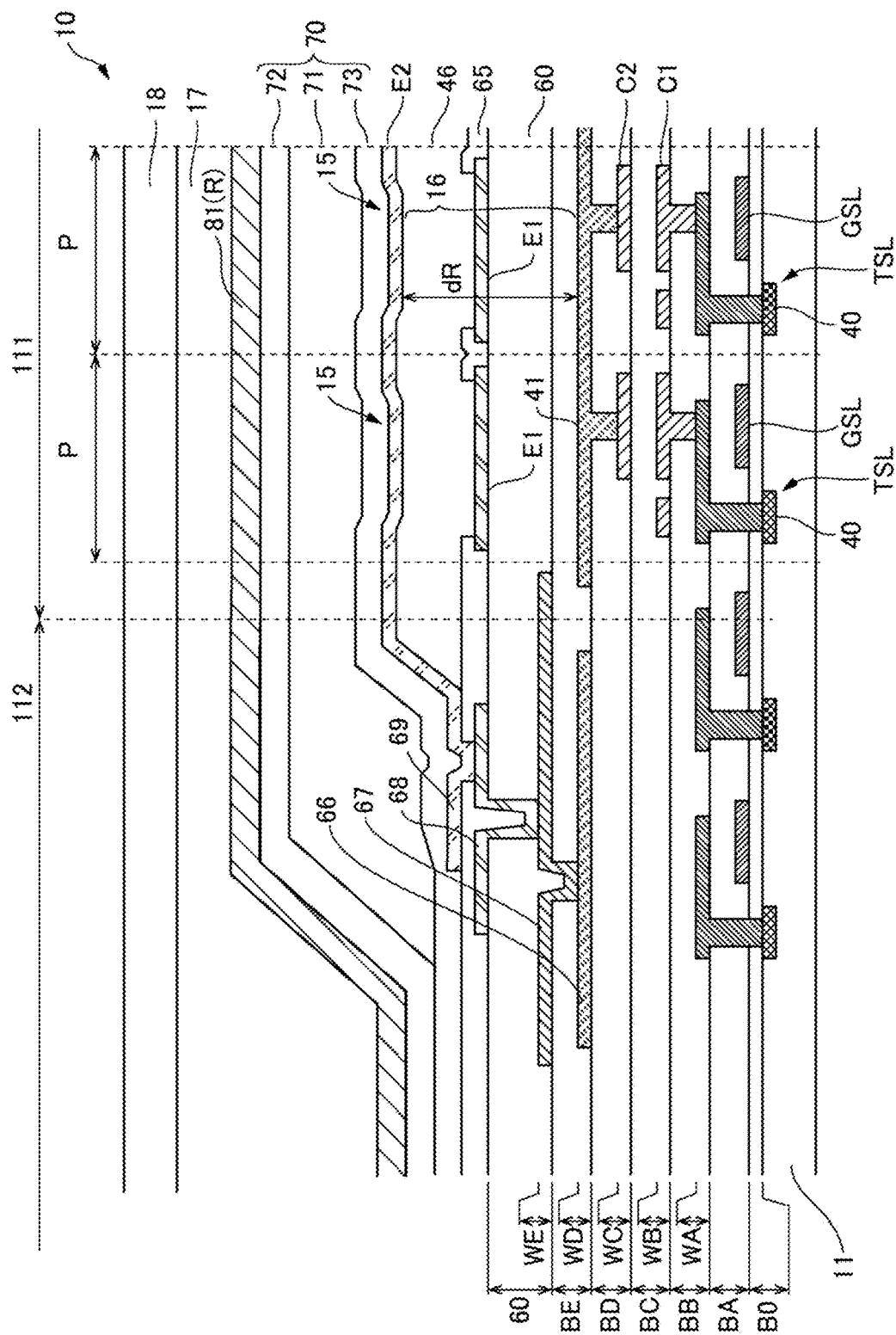
FIG. 6 is a cross-sectional view of the first panel illustrated in FIG. 1.

FIG. 6 is a cross-sectional view of the first panel 10 illustrated in FIG. 1. As illustrated in FIG. 6, an active region 40 (a source/drain region) for a transistor, such as the selection transistor TSL of the pixel P, is formed on the first substrate 11, and the upper surface of the active region 40 is covered by an insulating film BO (a gate insulating film). A gate electrode G is formed on the upper surface of the insulating film BO. A multilayer wiring layer, in which a plurality of insulating layers BA to BE and a plurality of wiring layers WA to WE are alternately laminated, is formed on the upper layer side of the gate electrode G. Each of the wiring layers is formed of a low-resistance conductive material that contains aluminum, silver, or the like. The wiring layer WA that includes the scanning lines 62 and the like illustrated in FIG. 5 is formed on the upper surface of the insulating layer BA. The wiring layer WB that includes the signal lines 61, the first electrodes C1 and the like illustrated in FIG. 5 is formed on the upper layer of the insulating layer BB. The wiring layer WC that includes the second electrodes C2 and the like illustrated in FIG. 5 is formed on the surface layer of the insulating layer BC. The wiring layer WD that includes the first power supply conductors 48 and the like illustrated in FIG. 5 is formed on the surface layer of the insulating layer BD. The wiring layer WE that includes wiring 69, wiring 67 and the like is formed on the upper layer of the insulating layer BE.

An optical path adjusting layer 60 is formed on the upper layer of the insulating layer BE. The optical path adjusting layer 60 is an element used to set a resonance wavelength of an optical resonator 16 to a red wavelength, and is formed of a light-transmissive insulating material of silicon nitride, silicon oxide or the like. Specifically, by appropriately adjusting an optical path length dR (an optical distance) between the first power supply conductor 48 and the second electrode E2 that configure the optical resonator 16, in accordance with a film thickness of the optical path adjusting layer 60, the resonance wavelength is set with respect to the light emitted from the first panel 10. In the exemplary embodiment, since the red first image light LR is emitted from the first panel 10, the optical path length of the optical resonator 16 is set to a value appropriate for the first image light LR. Thus, the optical resonator 16 generally has the same transmittance-wavelength characteristics (see FIG. 2) as those of the first pigment layer 81(R) illustrated in FIG. 1.

The first electrode E1 is formed on the upper surface of the optical path adjusting layer 60, for each of the pixels P in the first display region 111. The first electrode E1 is formed of a light-transmissive conductive material, such as indium tin oxide (ITO), for example. An insulating pixel defining layer 65 is formed around the first electrode E1. The light-emitting functional layer 46 is formed on the upper surface of the first electrode E1. The light-emitting functional layer 46 is configured to contain the light-emitting layer formed by the organic EL material, and irradiates white light as a result of the supply of current. A transport layer or an injection layer of electrons or positive holes supplied to the light-emitting layer is sometimes provided in the light-emitting functional layer 46. The light-emitting functional layer 46 is formed continuously over the plurality of pixels P in the first display region 111.

The second electrode E2 is formed on the upper layer of the light-emitting functional layer 46, over the entire area of the first display region 111, and, of the light-emitting functional layer 46, a region (a light-emitting region) sandwiched by the first electrode E1 and the second electrode E2 emits light. The second electrode E2 allows some of the light that has reached it to pass through, and also functions as a semitransparent reflection layer that reflects back the rest of the light. For example, by forming a photoreflective conductive material, such as an alloy containing silver or magnesium, of a sufficiently thin film thickness, the semitransparent reflective second electrode E2 is formed. The radiated light from the light-emitting functional layer 46 reciprocates between the first power supply conductor 48 and the second electrode E2, and components of a particular resonance wavelength are selectively amplified. Then, the reciprocating light passes through the second electrode E2 and is emitted to an observation side (the opposite side to the first substrate 11). In other words, the optical resonator 16 is formed that causes the light emitted from the light-emitting functional layer 46 to resonate between the first power supply conductor 48 that functions as the reflection layer and the second electrode E2 that functions as the semitransparent reflection layer.

Here, in the peripheral region 112, the wiring 66, 67, 68, 69, and the like are formed in the same layers as the conductive layers formed in the first display region 111, and the wiring 66, 67, 68, and 69 are electrically connected via contact holes of the insulating layers formed between the wiring, for example. A sealing body 70 is formed on the upper layer side of the second electrode E2, over the entire area of the first substrate 11. The sealing body 70 is a light-transmissive film body that seals each of the structural elements formed on the first substrate 11 and prevents the infiltration of outside air and moisture, and is configured by a laminated film of a first sealing layer 71, a second sealing layer 72, and a third sealing layer 73, for example. The third sealing layer 73 is formed on the upper layer of the second electrode E2 and is in direct contact with the upper surface of the second electrode E2. The third sealing layer 73 is an insulating inorganic material such as a silicon compound (typically, silicon nitride or silicon oxide), for example. The first sealing layer 71 functions as a flattening film that buries level differences of the surface of the second electrode E2 and the third sealing layer 73. The first sealing layer 71 is formed of a light-transmissive organic materials, such as an epoxy resin, for example. The second sealing layer 72 is formed over the entire area of the first substrate 11. The second sealing layer 72 is formed of a silicon nitride compound, a silicon oxide compound, or the like, for example, which offer excellent water-resistant and heat-resistant properties.

The first pigment layer 81(R) is formed over the entire or substantially entire region of the first display region 111 and the peripheral region 112, on the upper surface of the sealing body 70 (the second sealing layer 72). The first pigment layer 81(R) allows the red light of the first wavelength region to pass through. Further, in the first panel 10, a transmissive cover substrate 18 is fixed to the first pigment layer 81(R), on the opposite side to the first substrate 11, by an adhesive 17.

Configuration of Second Panel 20 and Third Panel 30

Figure 7:
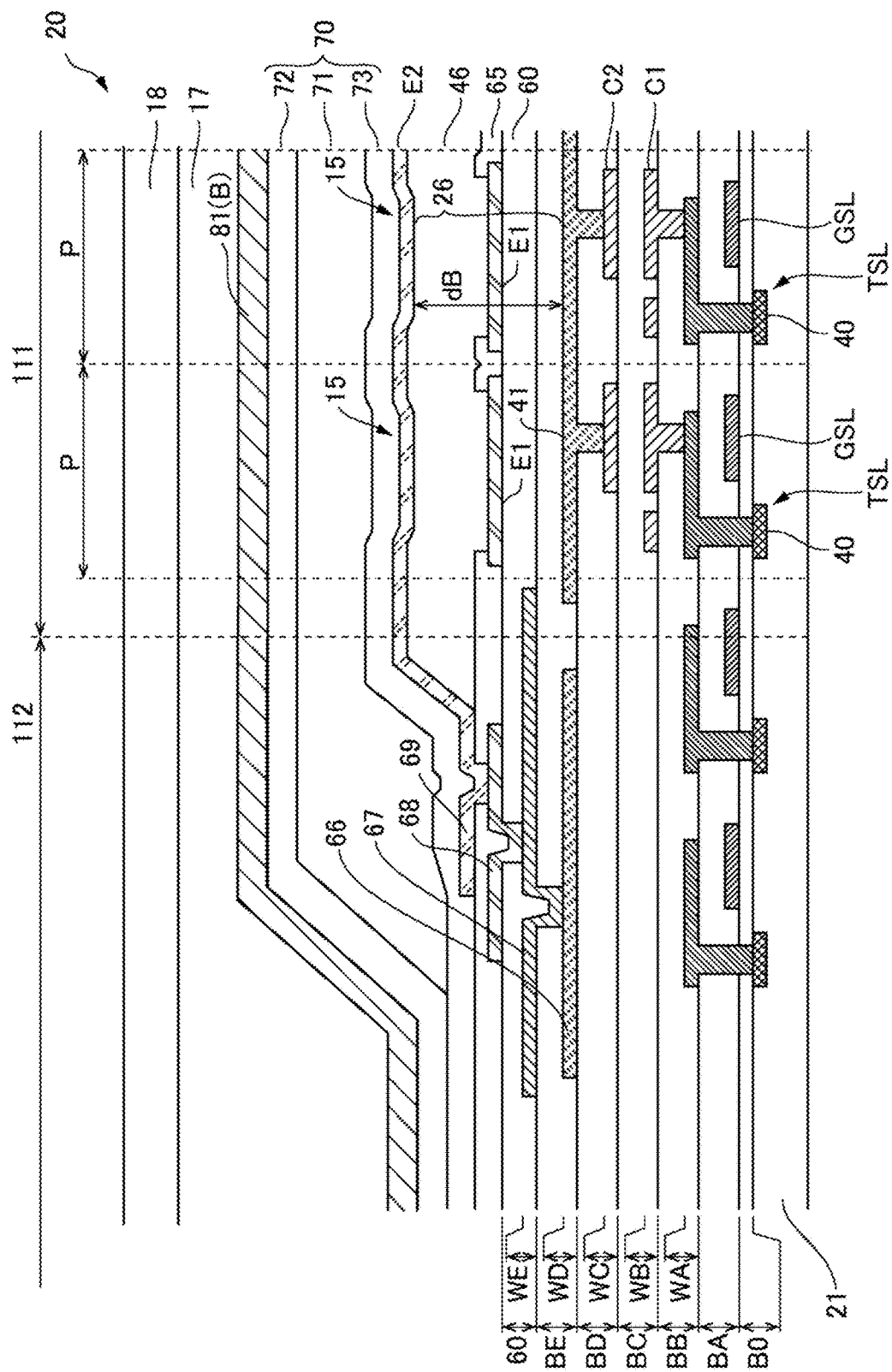
FIG. 7 is a cross-sectional view of a second panel illustrated in FIG. 1.
Figure 8:
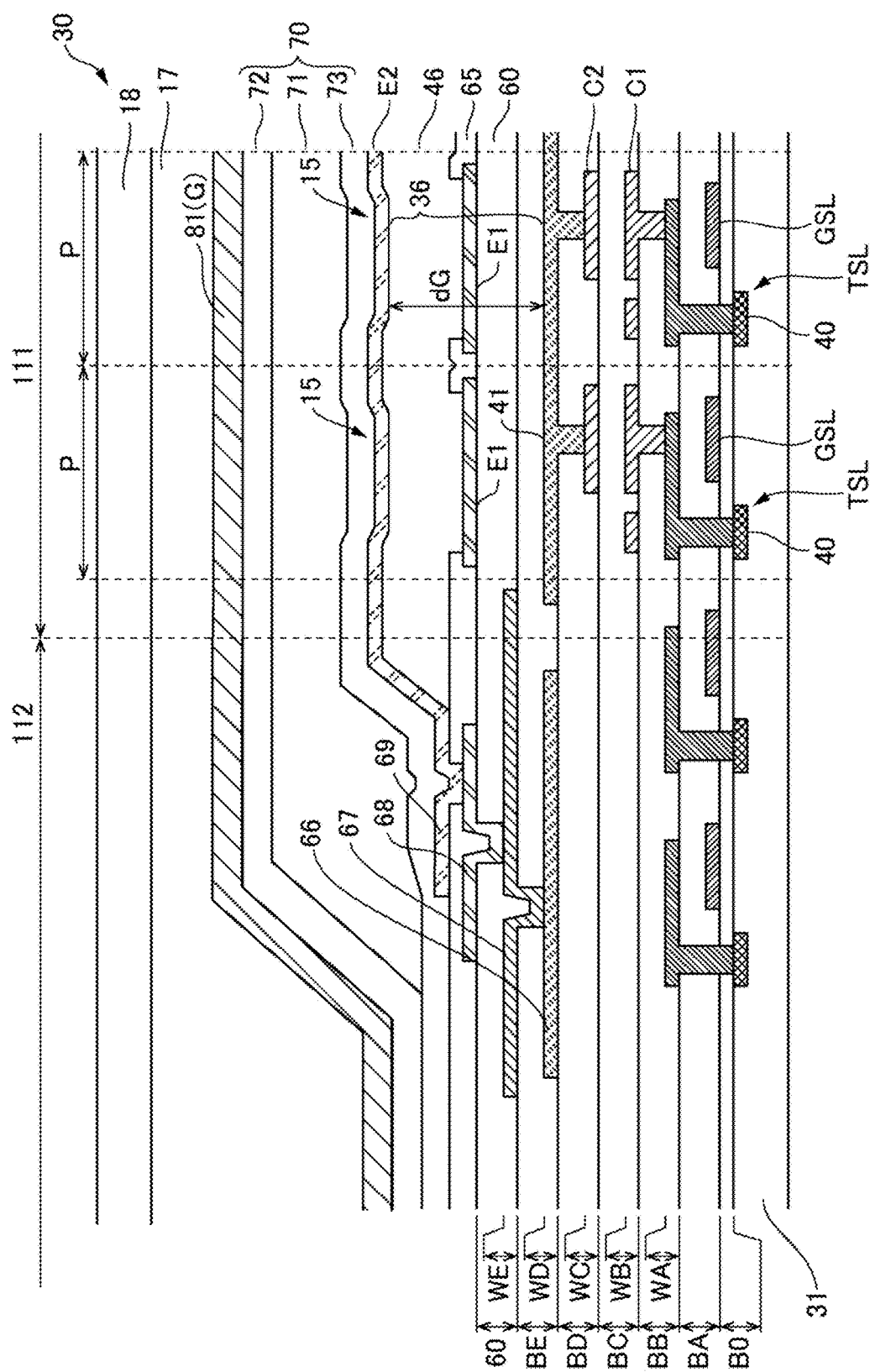
FIG. 8 is a cross-sectional view of a third panel illustrated in FIG. 1.

FIG. 7 is a cross-sectional view of the second panel 20 illustrated in FIG. 1. FIG. 8 is a cross-sectional view of the third panel 30 illustrated in FIG. 1. Similar to the first panel 10, the second panel 20 and the third panel 30 illustrated in FIG. 1 have the electrical configuration explained with reference to FIG. 5 and FIG. 6, and the second light-emitting elements 25 and the third light-emitting elements 35 are formed in place of the first light-emitting elements 15.

As illustrated in FIG. 7, in the second panel 20, in place of the first pigment layer 81(R) explained with reference to FIG. 6, the second pigment layer 81(B) is formed over the entire or substantially entire region of the second display region 211 and the peripheral region 212, and the second pigment layer 81(B) allows the blue light of the second wavelength region to pass through. Further, the film thickness of the optical path adjusting layer 60 illustrated in FIG. 7 is adjusted to correspond to the wavelength of the blue second image light LB emitted from the second panel 20, and an optical path length dB (the optical distance) between the first power supply conductor 48 and the second electrode E2 that configure an optical resonator 26 is optimized. Thus, the optical resonator 26 generally has the same transmittance-wavelength characteristics (see FIG. 2) as those of the second pigment layer 81(B) illustrated in FIG. 1. Further, in the second panel 20, a transmissive cover substrate 28 is fixed to the second pigment layer 81(B), on the opposite side to the second substrate 21, by an adhesive 27.

As illustrated in FIG. 8, in the third panel 30, in place of the first pigment layer 81(R) explained with reference to FIG. 6, the third pigment layer 81(G) is formed over the entire or substantially entire region of the third display region 311 and the peripheral region 312, and the third pigment layer 81(G) allows the green light of the third wavelength region to pass through. Further, the film thickness of the optical path adjusting layer 60 illustrated in FIG. 8 is adjusted to correspond to the wavelength of the green third image light LG emitted from the third panel 30, and an optical path length dG (the optical distance) between the first power supply conductor 48 and the second electrode E2 that configure an optical resonator 36 is optimized. Thus, the optical resonator 36 generally has the same transmittance-wavelength characteristics (see FIG. 2) as those of the third pigment layer 81(G) illustrated in FIG. 1. Further, in the third panel 30, a transmissive cover substrate 38 is fixed to the third pigment layer 81(G), on the opposite side to the third substrate 31, by an adhesive 37.

Optical Characteristics and the Like of Dichroic Prism 50

Figure 9:
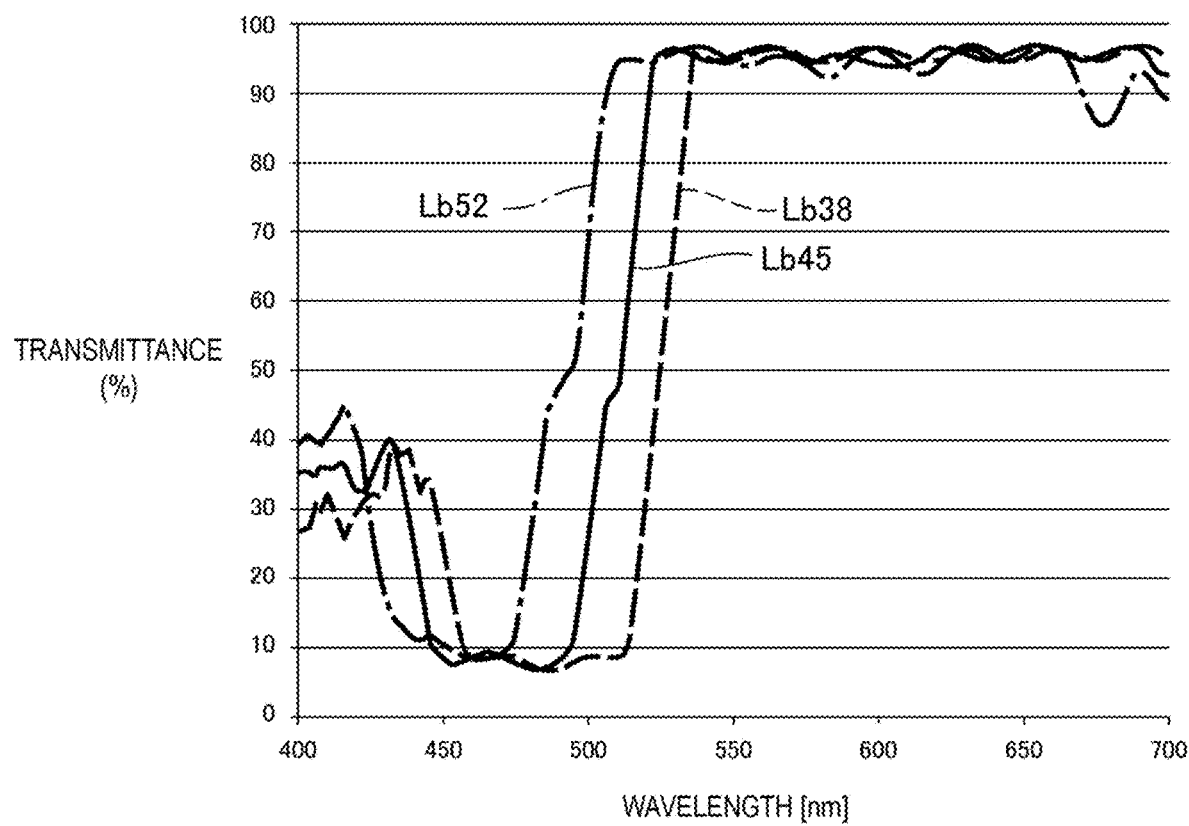
FIG. 9 is a graph illustrating transmittance-wavelength characteristics of a second dichroic mirror illustrated in FIG. 1.
Figure 10:
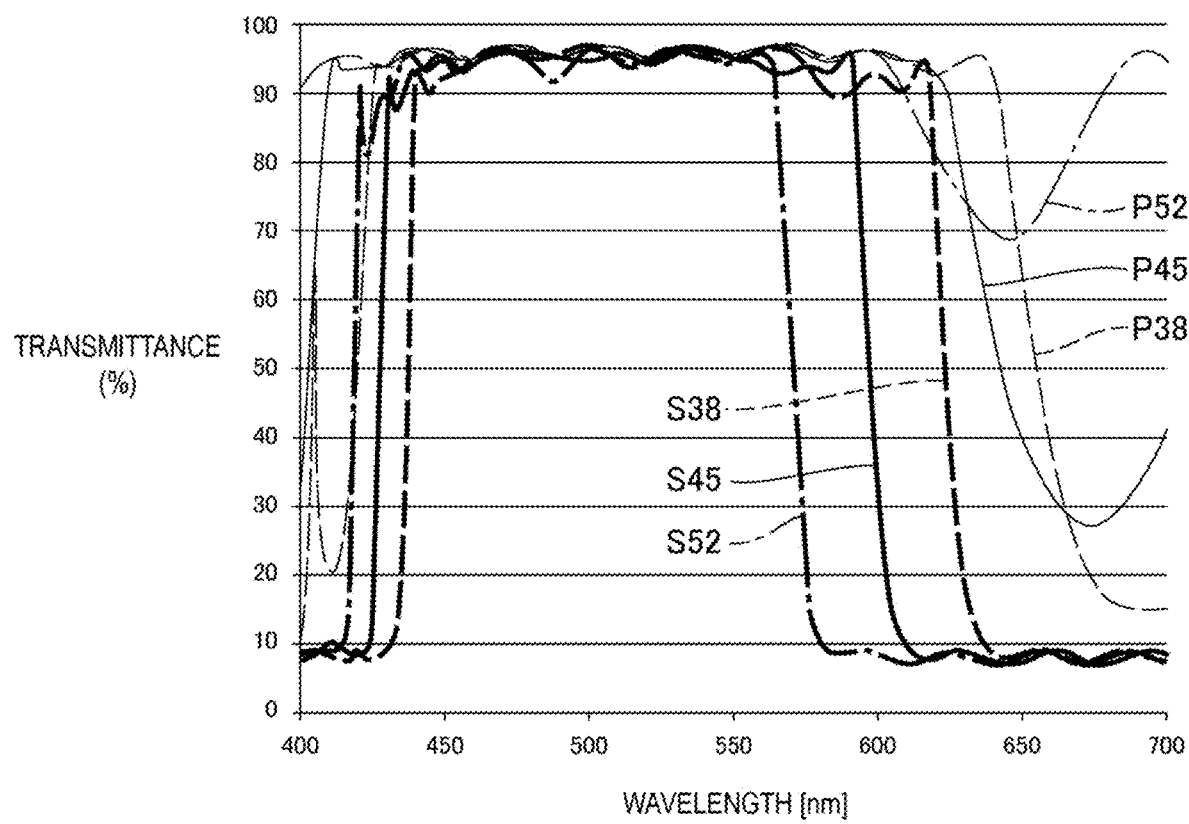
FIG. 10 is a graph illustrating transmittance-wavelength characteristics of a first dichroic mirror illustrated in FIG. 1.
Figure 11:
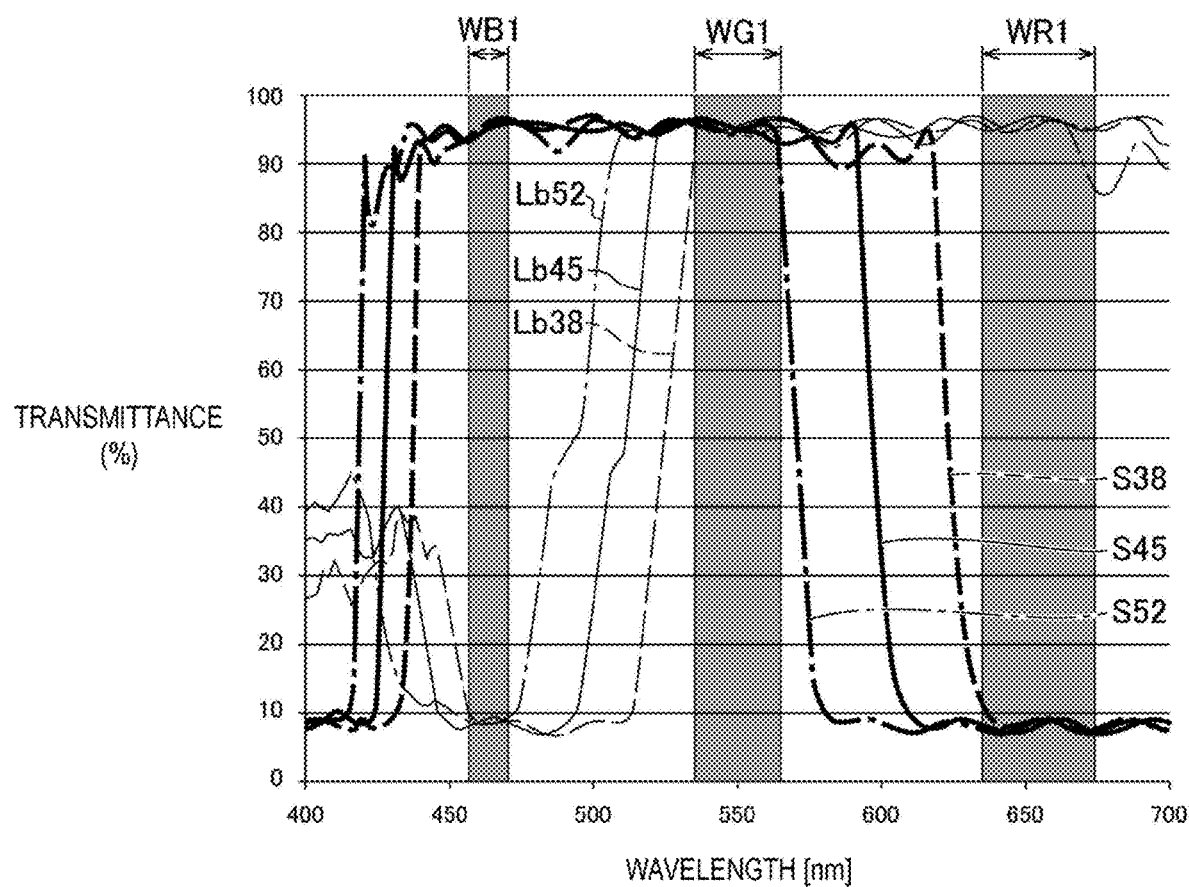
FIG. 11 is an explanatory diagram illustrating a wavelength range over which an image light can be used in the optical unit illustrated in FIG. 1.

FIG. 9 is a graph illustrating transmittance-wavelength characteristics of the second dichroic mirror 57 illustrated in FIG. 1. FIG. 10 is a graph illustrating transmittance-wavelength characteristics of the first dichroic mirror 56 illustrated in FIG. 1. FIG. 11 is an explanatory diagram illustrating a wavelength range over which the image light can be used in the optical unit 1 illustrated in FIG. 1.

With respect to the optical unit 1 illustrated in FIG. 1, in the exemplary embodiment, of first polarized light and second polarized light having mutually different polarization directions, a polarization element 80 that allows the first polarized light to pass through is arranged in an optical path from at least one of light-emitting elements, of the first light emitting elements 15, the second light emitting elements 25, and the third light emitting elements 35, to the dichroic prism 50. According to this configuration, at least one of the first dichroic mirror 56 and the second dichroic mirror 57 has polarization separation characteristics. In the exemplary embodiment, the polarization element 80 is arranged in the optical path from the at least one of light emitting elements including the first light emitting elements 15, the second light emitting elements 25, and the third light emitting elements 35, to the dichroic prism 50. In the exemplary embodiment, a polarization element 80 is arranged in an optical path from one panel of the first panel 10, the second panel 20, and the third panel 30, to the dichroic prism 50, the one panel including the at least one of light-emitting elements.

In the exemplary embodiment, when linearly polarized light having a polarization direction perpendicular to the surface of the drawing is polarized light S, and linearly polarized light having a polarization direction parallel to the surface of the drawing is polarized light P, the first polarized light is the polarized light S and the second polarized light is the polarized light P. Thus, of the unpolarized light emitted from the panel, the polarization element 80 allows the polarized light S to pass through.

Here, of the first panel 10, the second panel 20, and the third panel 30, the one panel is the panel corresponding to the image light having the longest wavelength, and of the first light emitting elements 15, the second light emitting elements 25, and the third light emitting elements 35, the at least one of light-emitting elements is a light emitting element corresponding to the image light having the longest wavelength. Further, the one panel is the panel that has the longest life when the first panel 10, the second panel 20, and the third panel 30 are driven under a condition in which synthesized light of light emitted from the first light emitting elements 15 of the first panel 10, light emitted from the second light emitting elements 25 of the second panel 20, and light emitted from the third light emitting elements 35 of the third panel 30 forms white light. For example, when the first panel 10, the second panel 20, and the third panel 30 are driven under the above-described condition, the one panel is the panel with the smallest emission intensity deterioration characteristics or the smallest spectrum change characteristics.

In the exemplary embodiment, since, of the first panel 10, the second panel 20, and the third panel 30, the first panel 10 emits the first image light LR that has the longest wavelength, the first panel 10 is the panel that has the longest life, in which an optical deterioration of the first pigment layer 81(R) is the smallest, for example. Thus, the polarization element 80 is arranged in an optical path from the first panel 10 to the dichroic prism 50. Further, while the first dichroic mirror 56 has the polarization separation characteristics, the second dichroic mirror 57 does not have the polarization separation characteristics.

Specifically, as indicated by a solid line Lb45 in FIG. 9, of the light that is incident at the 45 degree angle, the second dichroic mirror 57 allows the light having a wavelength of approximately 520 nm or greater to pass through and reflects the light having a wavelength of approximately 490 nm or less. Thus, regardless of whether the light is polarized light or unpolarized light, the second dichroic mirror 57 reflects the second image light LB toward the emission surface 54, and allows the first image light LR and the unpolarized third image light LG to pass through. Note that, of the light having a wavelength from 490 nm to 520 nm, the longer the wavelength, the greater the transmittance.

Further, the transmittance and the reflectance of the second dichroic mirror 57 are incident angle dependent. For example, for the second dichroic mirror 57, as indicated by a dashed line Lb38 in FIG. 9, the wavelength region that passes through shifts more to the long wavelength side when the incident angle is 38 degrees than when the incident angle is 45 degrees, and as indicated by a one-dot chain line Lb52 in FIG. 9, the wavelength region that passes through shifts more to the short wavelength side when the incident angle is 52 degrees than when the incident angle is 45 degrees.

Meanwhile, as indicated by a thick solid line S45 in FIG. 10, of the light that is incident at the 45 degree angle, the first dichroic mirror 56 allows the light having a wavelength of approximately 620 nm or greater to pass through and reflects the light having a wavelength of approximately 590 nm or less. Thus, the first dichroic mirror 56 reflects the first image light LR, which is the polarized light S that has passed through the polarization element 80, toward the emission surface 54 and allows the second image light LB and the third image light LG to pass through. Further, of the light having a wavelength from 590 nm to 620 nm, the longer the wavelength, the lower the transmittance.

Further, the transmittance and the reflectance of the first dichroic mirror 56 are incident angle dependent. For example, with respect to the first dichroic mirror 56, as indicated by a thick dashed line S38 in FIG. 10, the wavelength region that passes through shifts more to the long wavelength side when the light is the polarized light S having the incident angle of 38 degrees than when the light is the polarized light S having the incident angle of 45 degrees, and as indicated by a thick one-dot chain line S52 in FIG. 10, the wavelength region that passes through shifts more to the short wavelength side when the light is the polarized light S having the incident angle of 52 degrees than when the light is the polarized light S having the incident angle of 45 degrees.

Note that, with respect to the first dichroic mirror 56, as indicated by a thin solid line P45, a thin dashed line P38, and a thin one-dot chain line P52 in FIG. 10, the polarized light P that is incident at the 45 degree angle, the polarized light P that is incident at the 38 degree angle, and the polarized light P that is incident at the 52 degree angle have high transmittance even when the wavelength of the light is approximately 620 nm or greater.

Thus, as illustrated in FIG. 11, when the transmittance-wavelength characteristics of the second dichroic mirror 57 illustrated in FIG. 9, and the transmittance-wavelength characteristics of the first dichroic mirror 56 illustrated in FIG. 10 with respect to the polarized light S are synthesized, it can be said that the light in wide wavelength ranges WR1, WB1, and WG1 can be used for the first wavelength region (red) and the third wavelength region (green). Specifically, in the dichroic prism 50, with respect to the polarized light S of the first wavelength region (red), light having the incident angle from 38 degrees to 52 degrees is reflected by the first dichroic mirror 56 over the wide wavelength region WR1 from 635 nm to 675 nm. Further, with respect to the unpolarized light of the third wavelength region (green), the light having the incident angle from 38 degrees to 52 degrees passes through the first dichroic mirror 56 and the second dichroic mirror 57 over the wide wavelength region WG1 from 535 nm to 565 nm. Further, with respect to the unpolarized light of the second wavelength region (blue), the light having the incident angle from 38 degrees to 52 degrees is reflected by the second dichroic mirror 57 over the wide wavelength range WB1 from 460 nm to 470 nm.

Comparative Example

Figure 12:
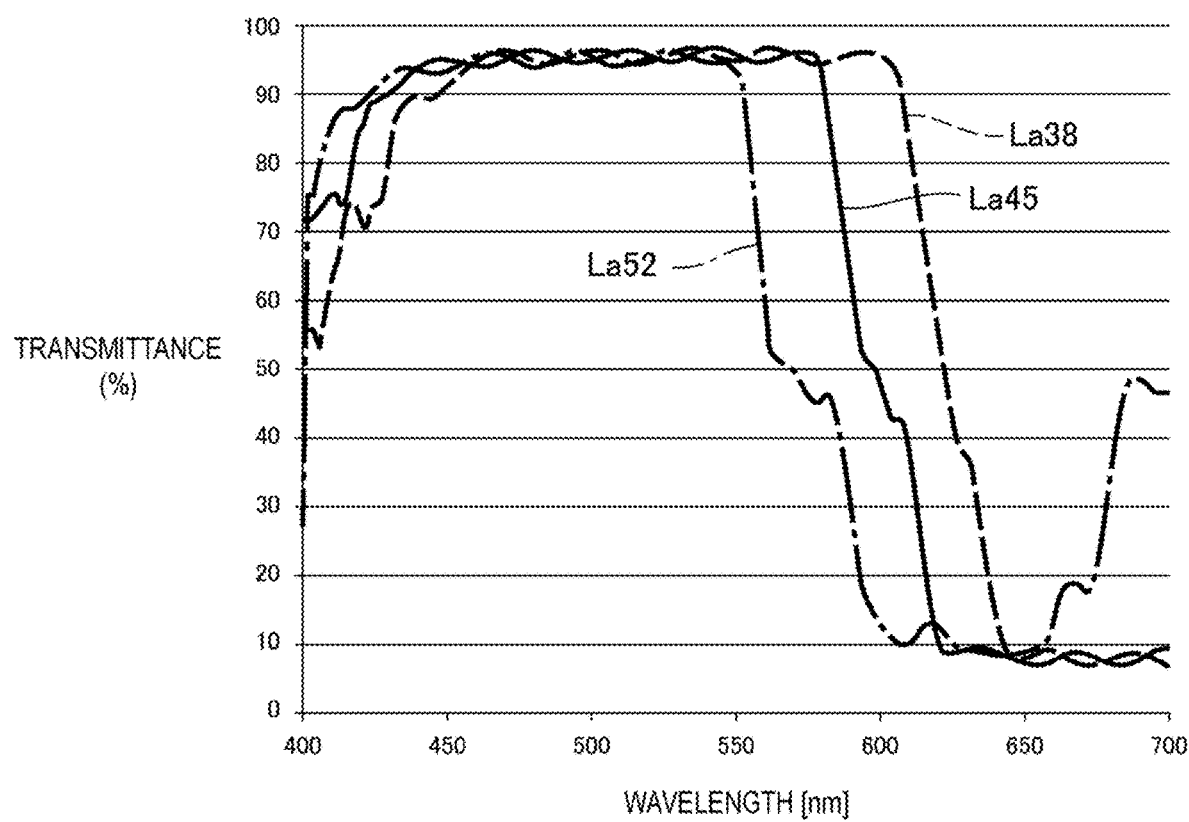
FIG. 12 is a graph illustrating transmittance-wavelength characteristics of a reference example in which the first dichroic mirror illustrated in FIG. 1 does not have polarization separation characteristics.
Figure 13:
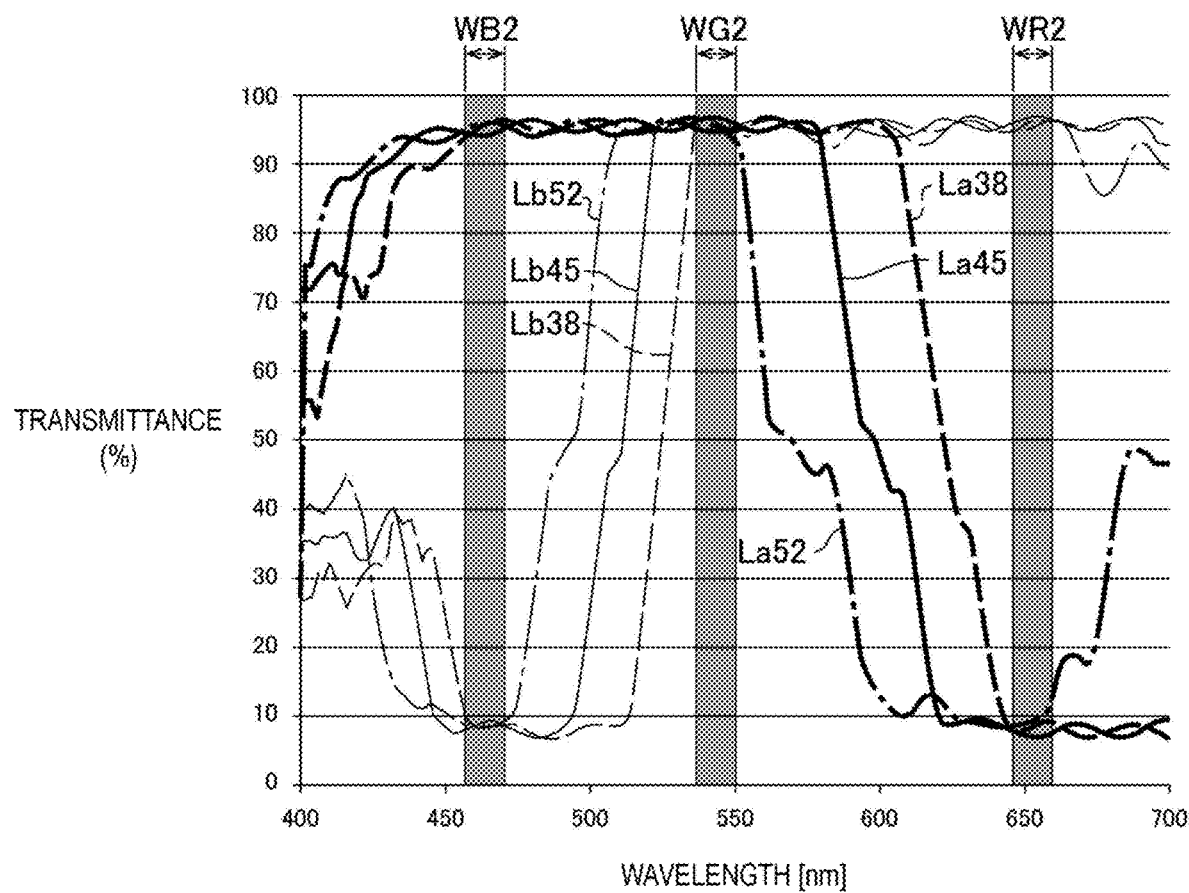
FIG. 13 is an explanatory diagram illustrating a wavelength range over which the image light can be used when the first dichroic mirror having the characteristics illustrated in FIG. 12 is used.

FIG. 12 is a graph illustrating transmittance-wavelength characteristics of a reference example in which the first dichroic mirror 56 illustrated in FIG. 1 does not have the polarization separation characteristics. FIG. 13 is an explanatory diagram illustrating a wavelength range over which the image light can be used when the first dichroic mirror 56 having the characteristics illustrated in FIG. 12 is used.

When the first dichroic mirror 56 does not have the polarization separation characteristics, as indicated by a solid line La45 in FIG. 12, of the light that is incident at the 45 degree angle, for example, the first dichroic mirror 56 allows the light having a wavelength of approximately 570 nm or less to pass through and reflects the light having a wavelength of approximately 620 nm or greater. Further, of the light having a wavelength from 570 nm to 620 nm, the longer the wavelength, the lower the transmittance. Further, with respect to the first dichroic mirror 56, as indicated by a dashed line La38 in FIG. 12, the wavelength region that passes through shifts more to the long wavelength side when the incident angle is 38 degrees than when the incident angle is 45 degrees, and as indicated by a one-dot chain line La52 in FIG. 12, the wavelength region that passes through shifts more to the short wavelength side when the incident angle is 52 degrees than when the incident angle is 45 degrees.

Thus, as illustrated in FIG. 13, when the transmittance-wavelength characteristics of the second dichroic mirror 57 illustrated in FIG. 10, and the transmittance-wavelength characteristics of the first dichroic mirror 56 illustrated in FIG. 12 are synthesized, it is ascertained that only the light over narrow wavelength ranges WR2 and WG2 can be used for the first wavelength region (red) and the third wavelength region (green), unlike in the case explained with reference to FIG. 11.

Specifically, in the dichroic prism 50, with respect to the light of the first wavelength region (red), the light having the incident angle from 38 degrees to 52 degrees is reflected by the first dichroic mirror 56 over the narrow wavelength range WR2 from 645 nm to 660 nm only. Further, with respect to the light of the third wavelength region (green), the light having the incident angle from 38 degrees to 52 degrees passes through the first dichroic mirror 56 and the second dichroic mirror 57 over the narrow wavelength range WG2 from 540 nm to 550 nm only. Note that, with respect to the light of the second wavelength region (blue), similar to the exemplary embodiment, the light having the incident angle from 38 degrees to 52 degrees is reflected by the second dichroic mirror 57 over the wavelength range WB2 from 460 nm to 470 nm.

Operation of Optical Unit 1

Figure 14:
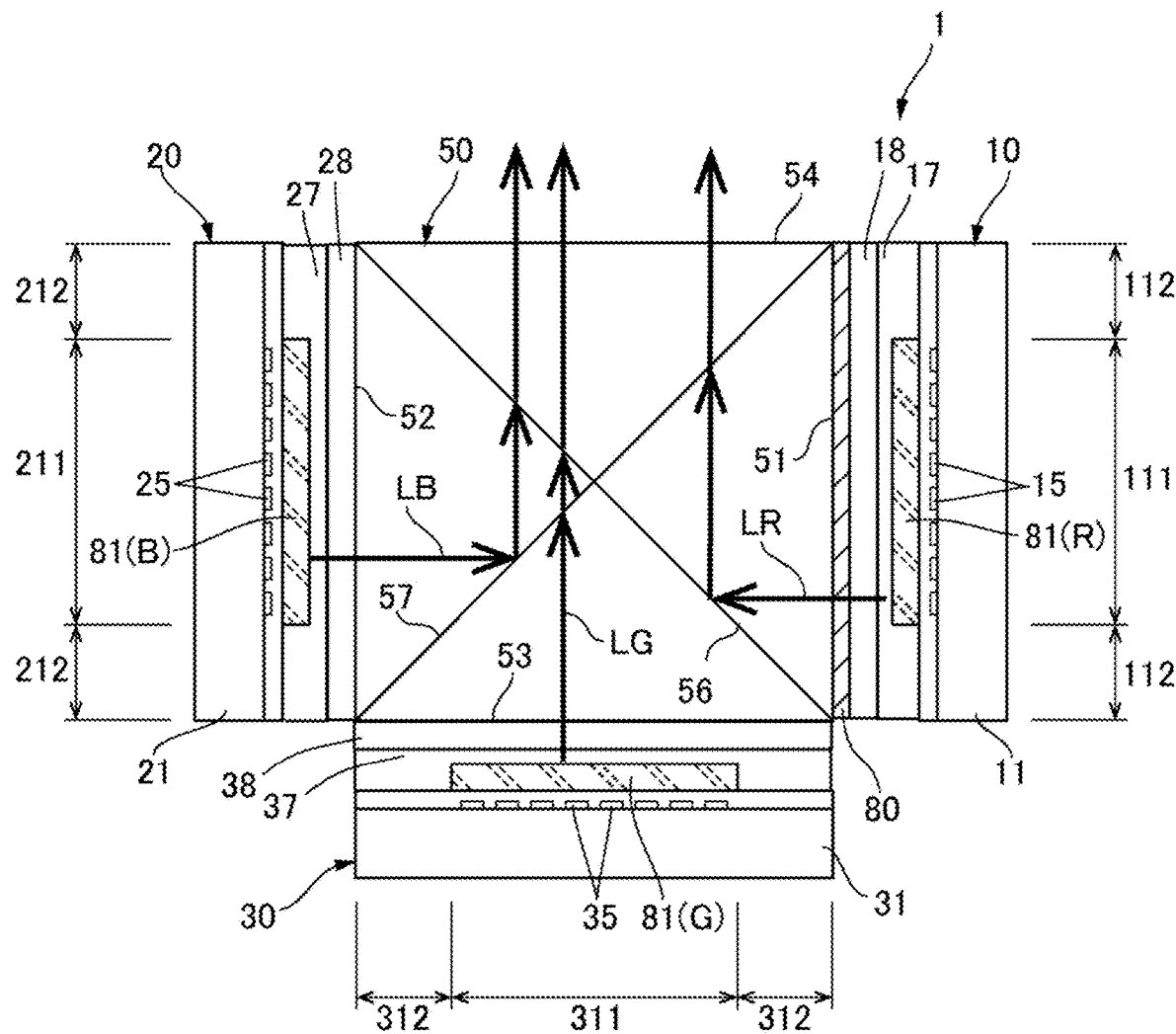
FIG. 14 is an explanatory diagram illustrating an operation of the optical unit to which the invention is applied.

FIG. 14 is an explanatory diagram illustrating an operation of the optical unit 1 to which the invention is applied. As illustrated in FIG. 14, in the optical unit 1 of the exemplary embodiment, when the unpolarized first image light LR emitted from the first panel 10 passes through the polarization element 80, only the polarized light S enters the dichroic prism 50 from the first incident surface 51. Then, after being reflected by the first dichroic mirror 56, for example, the first image light LR of the polarized light S passes through the second dichroic mirror 57 and is emitted from the emission surface 54.

The unpolarized second image light LB emitted from the second panel 20 enters the dichroic prism 50 from the second incident surface 52. Then, after being reflected by the second dichroic mirror 57, for example, the unpolarized second image light LB passes through the first dichroic mirror 56 and is emitted from the emission surface 54.

The unpolarized third image light LG emitted from the third panel 30 enters the dichroic prism 50 from the third incident surface 53. Then, after being reflected by the second dichroic mirror 57, for example, the unpolarized third image light LG passes through the first dichroic mirror 56 and is emitted from the emission surface 54.

Thus, the dichroic prism 50 emits, from the emission surface 54, a color image obtained by synthesizing the first image light LR of the polarized light S, the unpolarized second image light LB, and the unpolarized third image light LG. At this time, of the first image light LR emitted from the first panel 10, the polarized light P is not emitted from the emission surface 54. Thus, in the first panel 10, the light emission amount needs to be increased by increasing the electric current supplied to the first light emitting elements 15. Even in this case, since the first panel 10 has a longer life than that of the second panel 20 and the third panel 30, a situation is unlikely to occur in which the life of the optical unit 1 is significantly shortened due to the life of the first panel 10.

Main Effects of Exemplary Embodiment

As described above, in the optical unit 1 of the exemplary embodiment, the polarization element 80 is arranged in the optical path from the first panel 10 to the dichroic prism 50, and the first dichroic mirror 56 has the polarization separation characteristics. Thus, in addition to the transmittance-wavelength characteristics, the first dichroic mirror 56 performs the reflection and transmission of each of the color lights on the basis of a polarization direction of the incident light. Thus, even when there is a circumstance in which the light emitted from the first light emitting elements 15 includes oblique light that is significantly inclined with respect to the device optical axis, or even when there is a circumstance in which the first dichroic mirror 56 is incident angle dependent, the reflection of the first image light LR emitted from the first light emitting element 15 can be appropriately performed in the first dichroic mirror 56. Thus, when the optical unit 1 is used as the display device, a high quality image can be displayed without adopting a configuration in which the wavelength region of the color light emitted from the first panel 10 or the like is narrowed to an extreme extent, or a configuration in which, of a luminous flux emitted from the first panel 10, an effective luminous flux used for display of an image is significantly narrowed, for example.

Arrangement Range of Polarization Element 80

Figure 15:
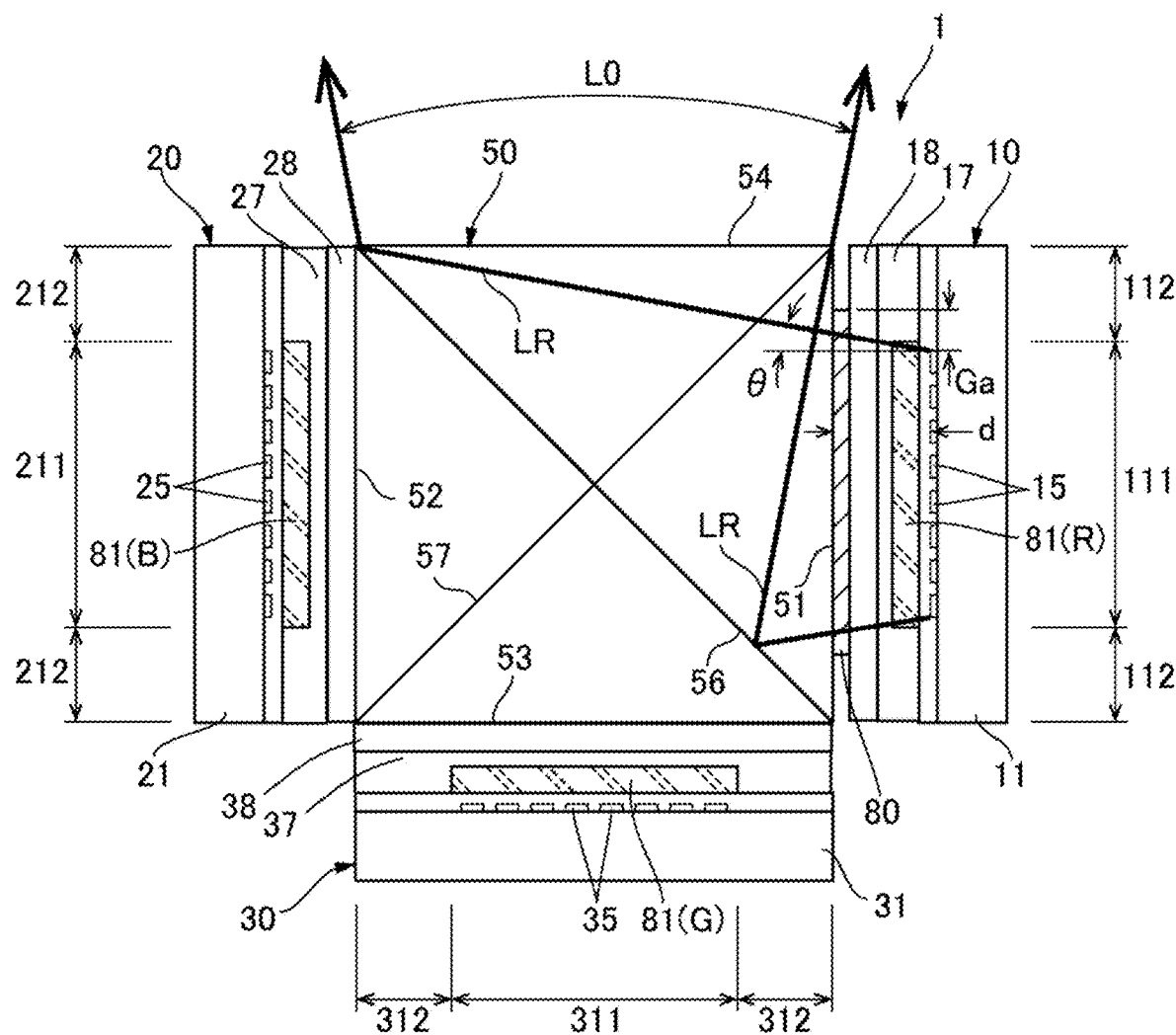
FIG. 15 is an explanatory diagram illustrating a first example of an arrangement range of a polarization element in the optical unit to which the invention is applied.
Figure 16:
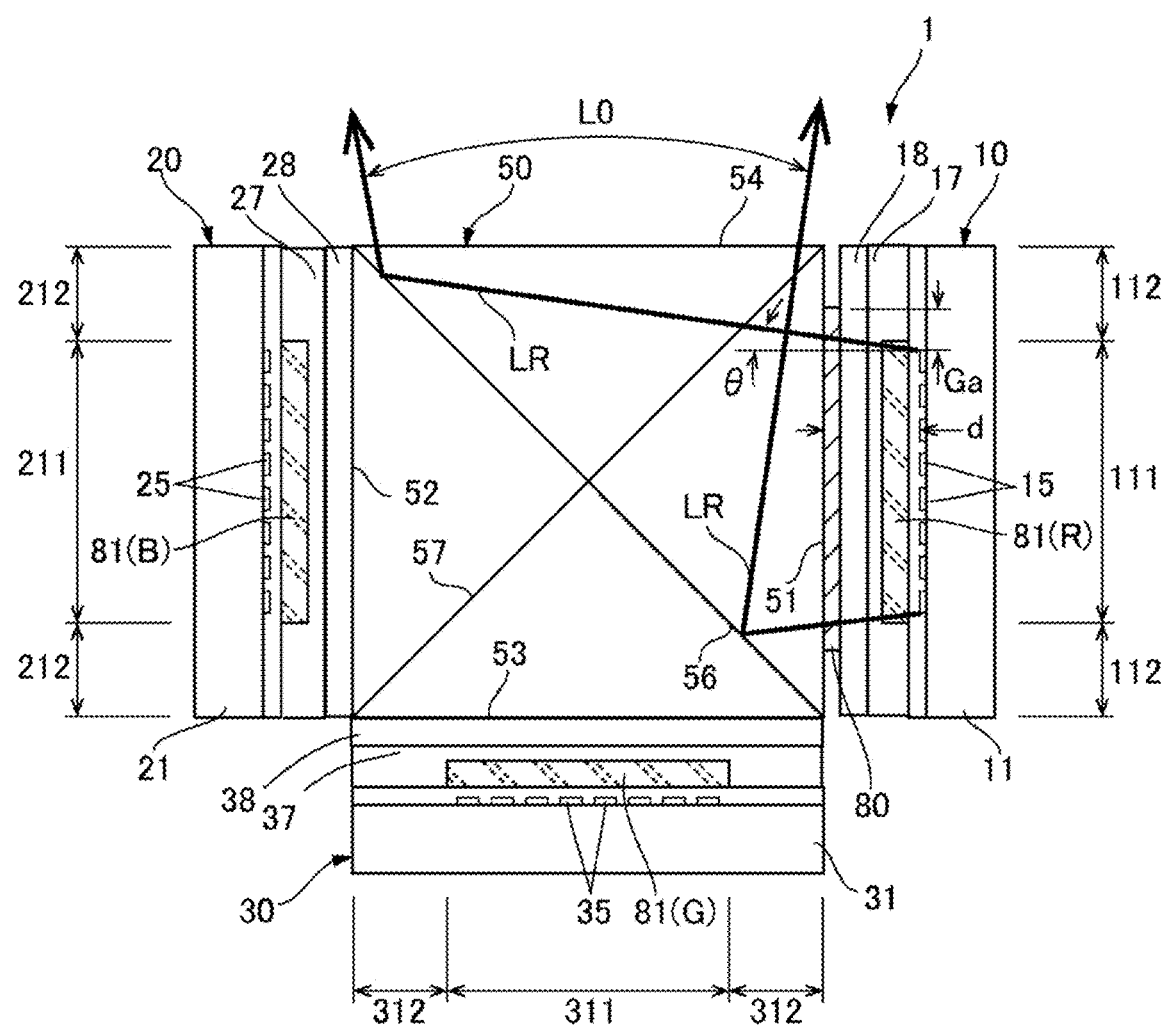
FIG. 16 is an explanatory diagram illustrating a second example of the arrangement range of the polarization element in the optical unit to which the invention is applied.

FIG. 15 is an explanatory diagram illustrating a first example of an arrangement range of the polarization element 80 in the optical unit 1 to which the invention is applied. FIG. 16 is an explanatory diagram illustrating a second example of the arrangement range of the polarization element 80 in the optical unit 1 to which the invention is applied. As illustrated in FIG. 15, and as explained taking the first image light LR emitted from the first panel 10 as an example, of a luminous flux of the first image light LR emitted toward the dichroic prism 50 from the first panel 10, the polarization element 80 is preferably provided at least in a region through which an effective luminous flux L0 corresponding to a luminous flux emitted from the emission surface 54 passes.

For example, when an angle between a ray of light positioned at the end of the effective luminous flux L0 and a normal line with respect to the first incident surface 51 is θ, a distance in the direction of the normal line with respect to the first incident surface 51 from the first light-emitting element 15 to the surface of the polarization element 80 on the dichroic prism 50 side is d, and an interval between an edge of the polarization element 80, when seen from the direction of the normal line with respect to the first incident surface 51, and the first light-emitting element 15 positioned on an end portion of the first display region 111 is Ga, the angle θ, the distance d, and the interval Ga preferably satisfy the following condition.

$$Ga \geq d*\tan\theta$$

Further, as illustrated in FIG. 16, of the luminous flux emitted from the emission surface 54, the polarization element 80 is preferably provided at least in a region through which the effective luminous flux L0 used for display of an image passes. In this case also, the angle θ between the ray of light positioned at the end of the effective luminous flux L0 and the normal line with respect to the first incident surface 51, the distance d in the direction of the normal line with respect to the first incident surface 51 from the first light-emitting element 15 to the surface of the polarization element 80 on the dichroic prism 50 side, and the interval Ga between the edge of the polarization element 80, when seen from the direction of the normal line with respect to the first incident surface 51, and the edge of the first display region 111 preferably satisfy the following condition.

$$Ga \geq d*\tan\theta$$

Other Exemplary Embodiments

Although, in the above-described exemplary embodiment, the polarization element 80 is arranged between the first panel 10 and the dichroic mirror 50, a mode in which the polarization element 80 is integrally provided with the first panel 10, or a mode in which the polarization element 80 is integrally provided with the dichroic mirror 50 may also be adopted. Further, a mode in which the polarization element 80 is incorporated in the first panel 10 may also be adopted using a configuration in which the polarization element 80 is provided between the first panel 10 and the first light emitting elements 15, for example. Although, in the above-described exemplary embodiment, the first pigment layer 81(R) is provided in the first panel 10, the second pigment layer 82(B) is provided in the second panel 20, and the third pigment layer 81(G) is provided in the third panel 30, the first pigment layer 81(R), the second pigment layer 82(B), and the third pigment layer 81(G) may be configured as separate members from the first panel 10, the second panel 20, and the third panel 30. Although, in the above-described exemplary embodiment, the light emitting elements emit white light, the invention may be applied to a case in which the first light emitting elements 15 provided in the first panel 10 directly emit the first image light LR of the first wavelength region, the second light emitting elements 25 provided in the second panel 20 directly emit the second image light LB of the second wavelength region, and the third light emitting elements 35 provided in the third panel 30 directly emit the third image light LG of the third wavelength region.

Although, in the above-described exemplary embodiment, the polarization element 80 is provided only between the first panel 10 and the dichroic prism 50, the polarization element 80 may be provided between the second panel 20 and the dichroic prism 50, or between the third panel 30 and the dichroic prism 50. Further, although, in the above-described exemplary embodiment, the first dichroic mirror 56 has the polarization separation characteristics, a mode in which the second dichroic mirror 57 has the polarization separation characteristics, or a mode in which both the first dichroic mirror 56 and the second dichroic mirror 57 have the polarization separation characteristics may also be adopted.

In all of the above-described exemplary embodiments, a case is exemplified in which each of the plurality of pixels has the organic electroluminescent element as the light-emitting element, but the invention may be applied to a case in which a light-emitting diode or the like is provided as the light-emitting element.

Configuration Example 1 of Display Device

Figure 17:
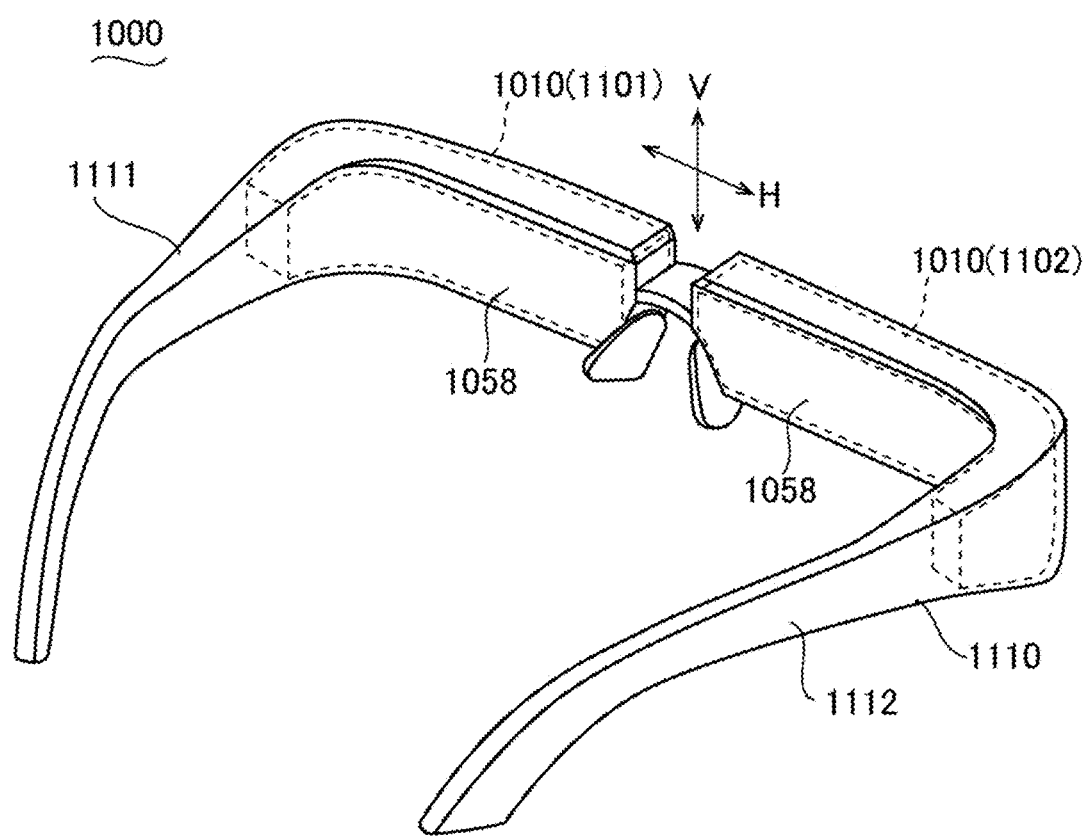
FIG. 17 is an explanatory diagram of a head-mounted display device.
Figure 18:
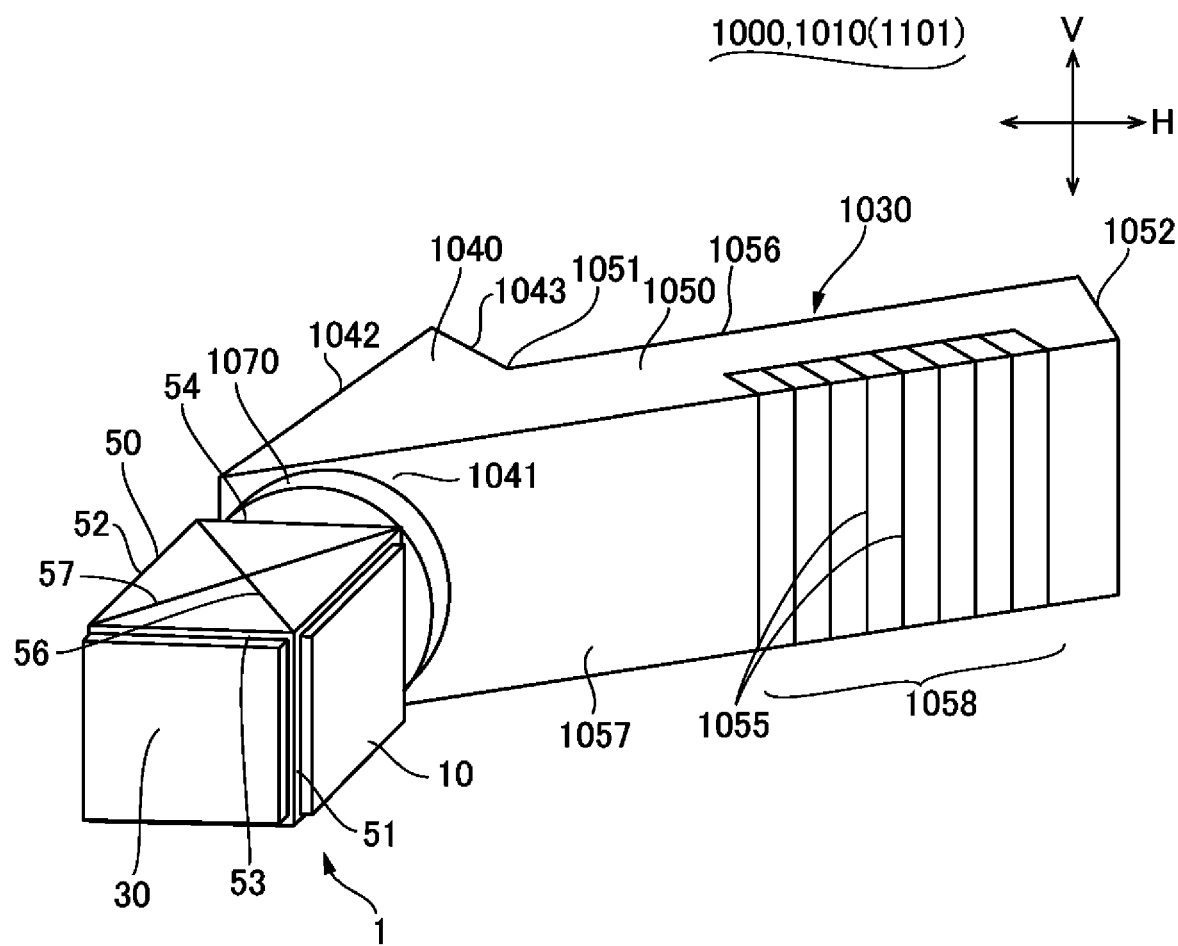
FIG. 18 is a perspective view schematically illustrating a configuration of an optical system of a display unit illustrated in FIG. 17.
Figure 19:
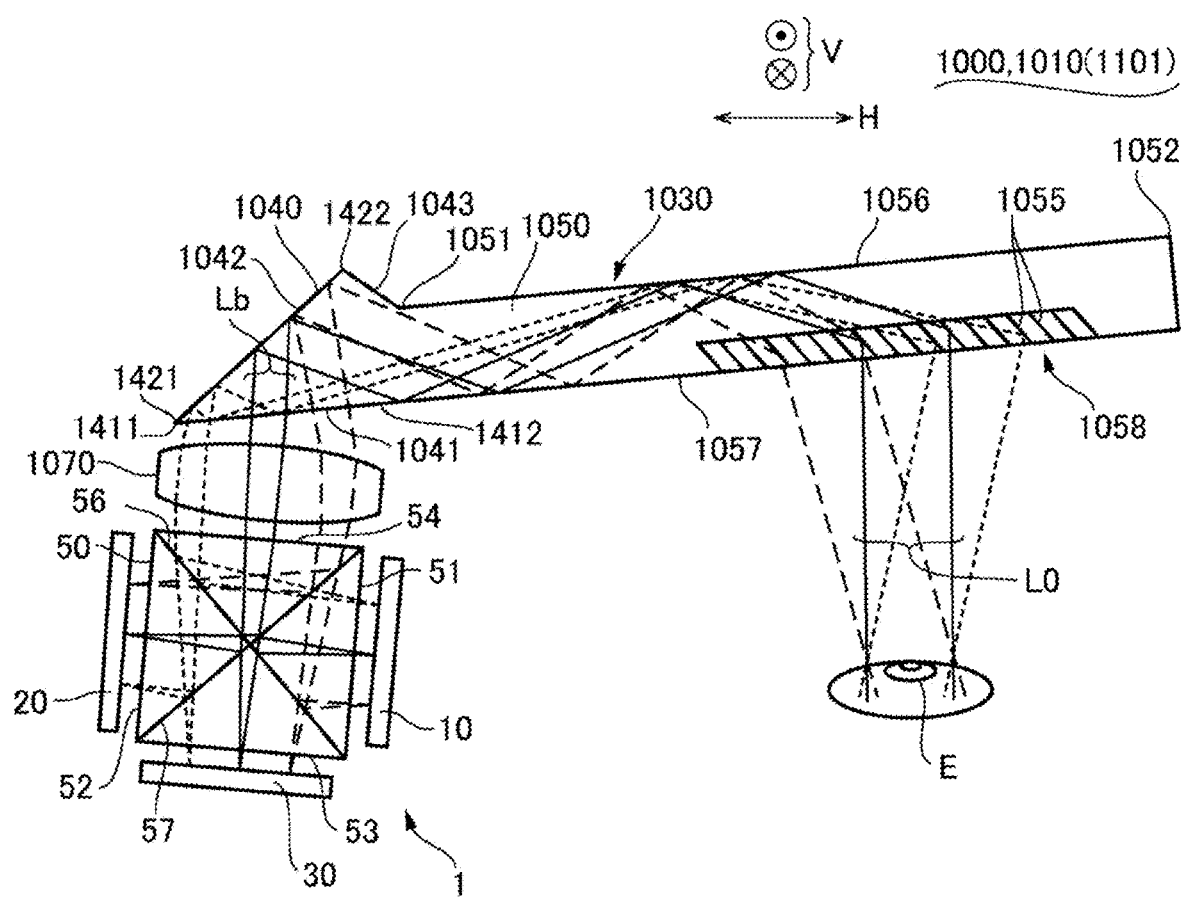
FIG. 19 is an explanatory diagram illustrating optical paths of the optical system illustrated in FIG. 18.

The optical unit 1 described in the above-described exemplary embodiments is used in a display device or the like described below. FIG. 17 is an explanatory diagram of a head-mounted display device 1000. FIG. 18 is a perspective view schematically illustrating a configuration of an optical system of virtual display units 1010 illustrated in FIG. 17. FIG. 19 is an explanatory diagram illustrating optical paths of the optical system illustrated in FIG. 18.

A display device 1000 illustrated in FIG. 17 is configured as a see-through eyeglass display, and includes a frame 1110 provided with left and right temples 1111 and 1112. In the display device 1000, the virtual display units 1010 are supported by the frame 1110, and an image emitted from the virtual display units 1010 is caused to be recognized as a virtual image by a user. In this exemplary embodiment, the display device 1000 is provided with a left-eye display unit 1101 and a right-eye display unit 1102 as the virtual display units 1010. The left-eye display unit 1101 and the right-eye display unit 1102 are disposed left-right symmetrically with the identical configuration.

Therefore, the left-eye display unit 1101 will be mainly described below, and the description of the right-eye display unit 1102 will be omitted. As illustrated in FIG. 18 and FIG. 19, in the display device 1000, the display unit 1101 includes the optical unit 1, and a light guide system 1030 that guides synthesized light Lb emitted from the optical unit 1 to an emission unit 1058. A projection lens system 1070 is disposed between the optical unit 1 and the light guide system 1030, and the synthesized light Lb emitted from the optical unit 1 enters the light guide system 1030 via the projection lens system 1070. The projection lens system 1070 is configured by a single collimate lens that has a positive power.

The light guide system 1030 is configured by a transmissive incident unit 1040 on which the synthesized light Lb is incident, and a transmissive light guide unit 1050, a one end 1051 side of which is connected to the incident unit 1040. In the embodiment, the incident unit 1040 and the light guide unit 1050 are configured as an integrated transmissive member.

The incident unit 1040 is provided with an incident surface 1041 on which the synthesized light Lb emitted from the optical unit 1 is incident, and a reflection surface 1042 that reflects the synthesized light Lb that has entered from the incident surface 1041 between the reflection surface 1042 and the incident surface 1041. The incident surface 1041 is a flat surface, an aspherical surface, a free form surface, or the like, and faces the optical unit 1 via the projection lens system 1070. The projection lens system 1070 is disposed obliquely such that an interval between the projection lens system 1070 and an end portion 1412 of the incident surface 1041 is larger than an interval between the projection lens system 1070 and an end portion 1411 of the incident surface 1041. A reflection film or the like is not formed on the incident surface 1041, but the incident surface 1041 fully reflects light that is incident at an incident angle equal to or greater than a critical angle. Thus, the incident surface 1041 has transmittance and reflectivity. The reflection surface 1042 is a surface facing the incident surface 1041 and is disposed obliquely such that an end portion 1422 of the reflection surface 1042 is separated farther from the incident surface 1041 than from an end portion 1421 of the incident surface 1041. Thus, the incident unit 1040 has a substantially triangular shape. The reflection surface 1042 is a flat surface, an aspherical surface, a free form surface, or the like. The reflection surface 1042 can adopt a configuration in which a reflective metal layer mainly formed of aluminum, silver, magnesium, chrome or the like is formed.

The light guide unit 1050 is provided with a first surface 1056 (a first reflection surface) that extends from a one end 1051 to another end 1052 side, a second surface 1057 (a second reflection surface) that extends in parallel to the first surface 1056 from the one end 1051 side to the other end 1052 side, and an emission portion 1058 provided on a section of the second surface 1057 that is separated from the incident unit 1040. The first surface 1056 and the reflection surface 1042 of the incident unit 1040 are joined together by an inclined surface 1043. A thickness of the first surface 1056 and the second surface 1057 is thinner than the incident unit 1040. The first surface 1056 and the second surface 1057 reflect all of the light that is incident at an incident angle equal to or greater than the critical angle, on the basis of a refractive index difference between the light guide unit 1050 and the outside (the air). Thus, a reflection film and the like is not formed on the first surface 1056 and the second surface 1057.

The emission unit 1058 is configured on a part of the light guide unit 1050 on the side of the second surface 1057 in the thickness direction of the light guide unit 1050. In the emission unit 1058, a plurality of partial reflection surfaces 1055 that are inclined obliquely with respect to a normal line with respect to the second surface 1057 are arranged so as to be mutually parallel to each other. The emission unit 1058 is a portion that overlaps with the plurality of partial reflection surfaces 1055, of the second surface 1057, and is a region having a predetermined width in an extending direction of the light guide unit 1050. Each of the plurality of partial reflection surfaces 1055 is formed by a dielectric multilayer film. Further, at least one of the plurality of partial reflection surfaces 1055 may be a composite layer of a dielectric multilayer film with a reflective metal layer (thin film) mainly formed of aluminum, silver, magnesium, chrome, or the like. When the partial reflection surface 1055 is configured to include the metal layer, an effect can be obtained to improve the reflectance of the partial reflection surface 1055, or an effect that the incident angle dependence or the polarization dependence of the transmittance and the reflectance of the partial reflection surface 1055 can be optimized. Note that the emission unit 1058 may be a mode in which an optical element, such as a diffraction grating, a hologram, or the like is provided.

In the display device 1000 configured in this manner, the synthesized light Lb formed of the parallel light incident from the incident unit 1040, is refracted by the incident surface 1041 and is oriented toward the reflection surface 1042. Next, the synthesized light Lb is reflected by the reflection surface 1042, and is once again oriented toward the incident surface 1041. At this time, since the synthesized light Lb is incident on the incident surface 1041 at the incident angle equal to or greater than the critical angle, the synthesized light Lb is reflected by the incident surface 1041 toward the light guide unit 1050, and is oriented toward the light guide unit 1050. Note that, in the incident unit 1040, the configuration is used in which the synthesized light Lb that is the parallel light is incident on the incident surface 1041, but a configuration may be adopted in which the incident surface 1041 and the reflection surface 1042 are configured by a free form curve or the like, and after the synthesized light Lb that is formed of the non-parallel light is incident on the incident surface 1041, the synthesized light Lb is reflected between the reflection surface 1042 and the incident surface 1041 and is converted to the parallel light while being reflected.

In the light guide unit 1050, the synthesized light Lb is reflected between the first surface 1056 and the second surface 1057, and advances. Then, a part of the synthesized light Lb that is incident on the partial reflection surface 1055 is reflected by the partial reflection surface 1055 and is emitted from the emission unit 1058 toward an eye E of an observer. Further, the rest of the synthesized light Lb incident on the partial reflection surface 1055 passes through the partial reflection surface 1055 and is incident to the next, adjacent, partial reflection surface 1055. As a result, the synthesized light Lb that is reflected by each of the plurality of partial reflection surfaces 1055 is emitted from the emission unit 1058 toward the eye E of the observer. Therefore, the observer can recognize a virtual image. At this time, of the light from the outside, the light that has entered the light guide unit 1050 from the outside passes through the partial reflection surfaces 1055 after entering the light guide unit 1050, and reaches the eye E of the observer. As a result, the observer can see the color image emitted from the optical unit 1 and can also see the outside background and the like in a see through manner.

Configuration Example 2 of Display Device

Figure 20:
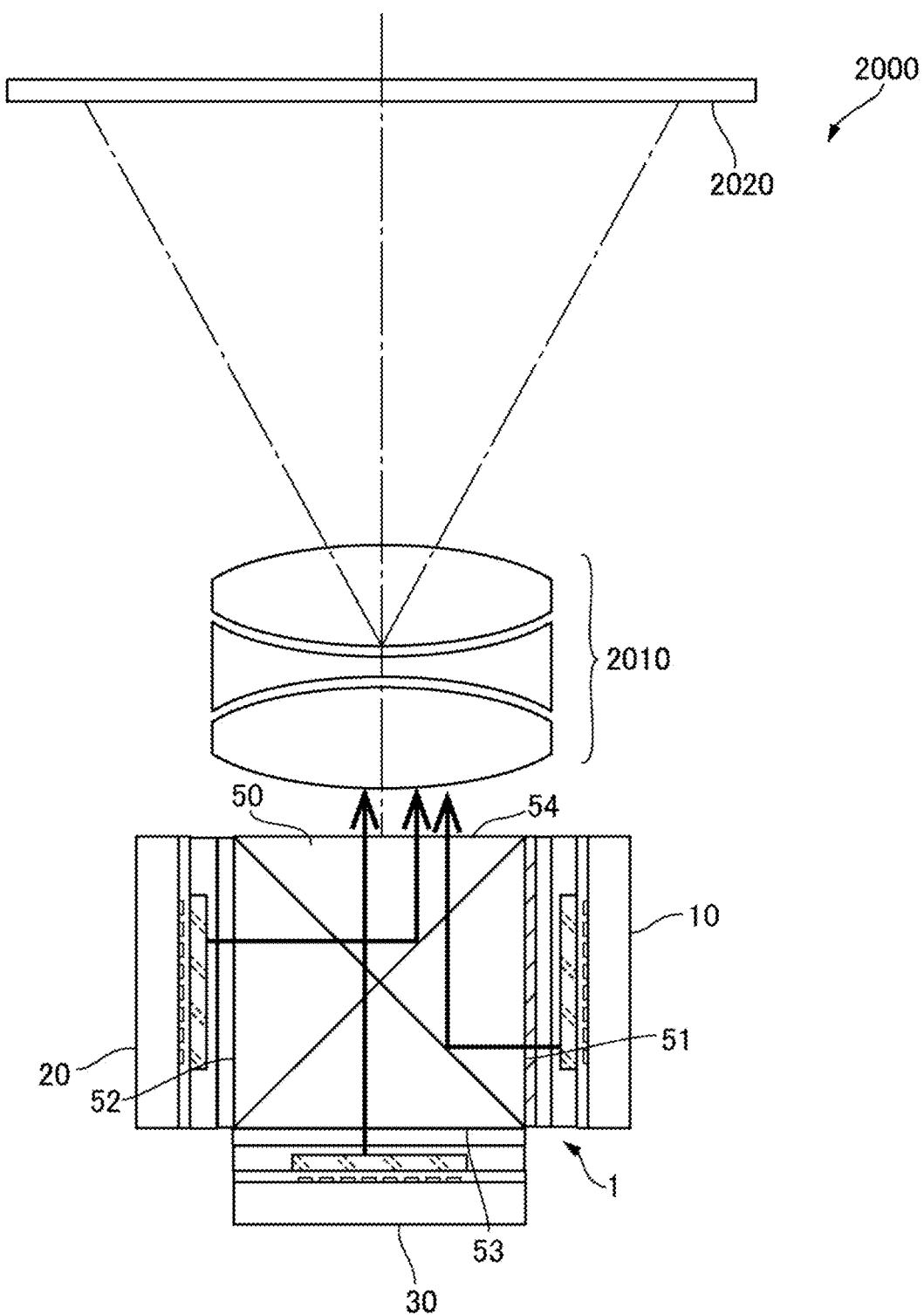
FIG. 20 is an explanatory diagram of a projection-type display device.

FIG. 20 is an explanatory diagram of a projection-type display device 2000. The display device 2000 illustrated in FIG. 20 includes the optical unit 1 according to the above-described exemplary embodiments, and a projection optical system 2100 that expands and projects the synthesized light Lb emitted from the optical unit 1 onto a projection receiving member 2200, such as a screen or the like.

Other Configuration Examples of Display Device

The display device (electronic apparatus) provided with the optical unit 1 described in the above-described exemplary embodiments can be an electronic view finder (EVF) or the like used in an imaging device, such as a video camera and a still camera.

The entire disclosure of Japanese Patent Application No. 2018-059469, filed Mar. 27, 2018 is expressly incorporated by reference herein.

What is claimed is:
1. An optical unit comprising:
a first panel provided with a first light-emitting element;
a second panel provided with a second light-emitting element;

a third panel provided with a third light-emitting element; and a dichroic prism including a first incident surface on which image light emitted from the first panel is incident as first image light of a first wavelength region, a second incident surface that faces the first incident surface, and on which image light emitted from the second panel is incident as second image light of a second wavelength region that is different from the first wavelength region, a third incident surface that is provided between the first incident surface and the second incident surface, and on which image light emitted from the third panel is incident as third image light of a third wavelength region that is different from the first wavelength region and the second wavelength region, an emission surface that faces the third incident surface, a first dichroic mirror that reflects the first image light toward the emission surface and allows the second image light and the third image light to pass through, and a second dichroic mirror that reflects the second image light toward the emission surface and allows the first image light and the third image light to pass through, wherein a single polarization element, which allows, of first polarized light and second polarized light having different polarization directions, the first polarized light to pass through, is arranged in an optical path from one light-emitting element of the first light emitting element, the second light emitting element, and the third light emitting element, to the dichroic prism, at least one of the first dichroic mirror and the second dichroic mirror has polarization separation characteristics, and two of the first image light, the second image light, and the third image light are unpolarized at respective incident surfaces of the dichroic prism.

2. The optical unit according to claim 1, wherein one of the first dichroic mirror and the second dichroic mirror has the polarization separation characteristics.

3. The optical unit according to claim 2, wherein the one light-emitting element is a light-emitting element corresponding to image light having the longest wavelength.

4. The optical unit according to claim 2, wherein the one light-emitting element is the light-emitting element having the longest life when the first light-emitting element, the second light-emitting element, and the third light-emitting element are driven under a condition in which synthesized light of light emitted from the first light-emitting element, light emitted from the second light-emitting element, and light emitted from the third light-emitting element forms white light, the one light-emitting element being provided to the panel of the first panel, the second panel, and the third panel which has the smallest emission intensity deterioration characteristics or the smallest spectrum change characteristics.

5. The optical unit according to claim 2, wherein the one light-emitting element is one of the first light-emitting element and the second light-emitting element.

6. The optical unit according to claim 2, wherein the single polarization element is arranged in an optical path from one panel of the first panel, the second panel, and the third panel, to the dichroic prism, the one panel including the one light-emitting element.

7. The optical unit according to claim 6, wherein of a luminous flux of image light emitted toward the dichroic prism from the one panel, the single polarization element is provided over an entire region through which an effective luminous flux corresponding to a luminous flux emitted from the emission surface passes.

8. The optical unit according to claim 6, wherein of a luminous flux of image light emitted toward the dichroic prism from the one panel, the single polarization element is provided over an entire region through which an effective luminous flux used in display of an image passes.

9. A display device comprising the optical unit according to claim 1, wherein the display device displays an image using synthesized light of the first image light, the second image light, and the third image light emitted from the emission surface of the dichroic prism.

10. The display device according to claim 9, further comprising:
a virtual display unit configured to display a virtual image using the synthesized light.

11. The display device according to claim 9, further comprising: a projection optical system configured to project the synthesized light.

12. The optical unit according to claim 1, wherein the first dichroic mirror has the polarization separation characteristics such that the first dichroic mirror reflects the first image light based on a polarization direction of the first image light, and
the second dichroic mirror is configured to reflect the second image light regardless of a polarization direction of the second image light.

* * * * *